United States Patent
Bhambhani et al.

(10) Patent No.: US 11,019,553 B1
(45) Date of Patent: May 25, 2021

(54) MANAGING COMMUNICATIONS WITH DEVICES BASED ON DEVICE INFORMATION

(71) Applicant: Amazon Technologies, Inc., Seattle, WA (US)

(72) Inventors: Kamal Bhambhani, Sunnyvale, CA (US); Premal Dinesh Desai, Cupertino, CA (US); Sanjay Rajput, Mountain View, CA (US); Shane Michael Wilson, Mercer Island, WA (US)

(73) Assignee: Amazon Technologies, Inc., Seattle, WA (US)

( * ) Notice: Subject to any disclaimer, the term of this patent is extended or adjusted under 35 U.S.C. 154(b) by 39 days.

(21) Appl. No.: 16/242,391

(22) Filed: Jan. 8, 2019

Related U.S. Application Data

(60) Provisional application No. 62/753,063, filed on Oct. 30, 2018.

(51) Int. Cl.
| | |
|---|---|
| *H04W 48/02* | (2009.01) |
| *H04W 76/18* | (2018.01) |
| *H04W 48/16* | (2009.01) |
| *H04W 36/00* | (2009.01) |
| *H04M 1/72463* | (2021.01) |

(52) U.S. Cl.
CPC ....... *H04W 48/02* (2013.01); *H04M 1/72463* (2021.01); *H04W 36/0022* (2013.01); *H04W 48/16* (2013.01); *H04W 76/18* (2018.02)

(58) Field of Classification Search
None
See application file for complete search history.

(56) References Cited

U.S. PATENT DOCUMENTS

| | | | |
|---|---|---|---|
| 2017/0325056 A1* | 11/2017 | Mehta | H04W 4/024 |
| 2018/0014183 A1* | 1/2018 | Burke | H04W 8/26 |

* cited by examiner

*Primary Examiner* — Jason E Mattis
*Assistant Examiner* — Hong Shao
(74) *Attorney, Agent, or Firm* — Kilpatrick Townsned & Stockton LLP

(57) ABSTRACT

Techniques for establishing communications with user devices are described herein. In an example, a system stores, in a user account, permission data to automatically establish a type of communications session by one or more user devices associated with the user account. The system receives, from a user device associated with the user account, contextual data about the user device. Based at least in part on the contextual data, the system determines that the user device is prohibited from automatically establishing the type of communications session. The system stores an indication that the user device is prohibited from automatically establishing the type of communications session.

20 Claims, 16 Drawing Sheets

US 11,019,553 B1

MANAGING COMMUNICATIONS WITH DEVICES BASED ON DEVICE INFORMATION

CROSS-REFERENCE TO RELATED APPLICATIONS

This application claims priority to and the benefit of U.S. Provisional Application No. 62/753,063, filed Oct. 30, 2018, and entitled "MANAGING COMMUNICATIONS BETWEEN DEVICES BASED ON DEVICE INFORMATION," the content of which is herein incorporated by reference in its entirety.

BACKGROUND

As voice recognition technology improves, systems that employ such technology continue to proliferate. Some systems employ what is referred to as near-field voice recognition where a user speaks into a microphone located on a hand held device, such as a remote control or mobile device. Other systems employ far-field voice recognition where a user can speak to a device while the user is within the general vicinity of the device, e.g., within the same room, but not necessarily in close proximity to or even facing the device. Both far-field devices and near-field devices can be used to exchange data over a communications session with one or more other devices.

BRIEF DESCRIPTION OF THE DRAWINGS

Various embodiments in accordance with the present disclosure will be described with reference to the drawings, in which.

DETAILED DESCRIPTION

Figure 1:
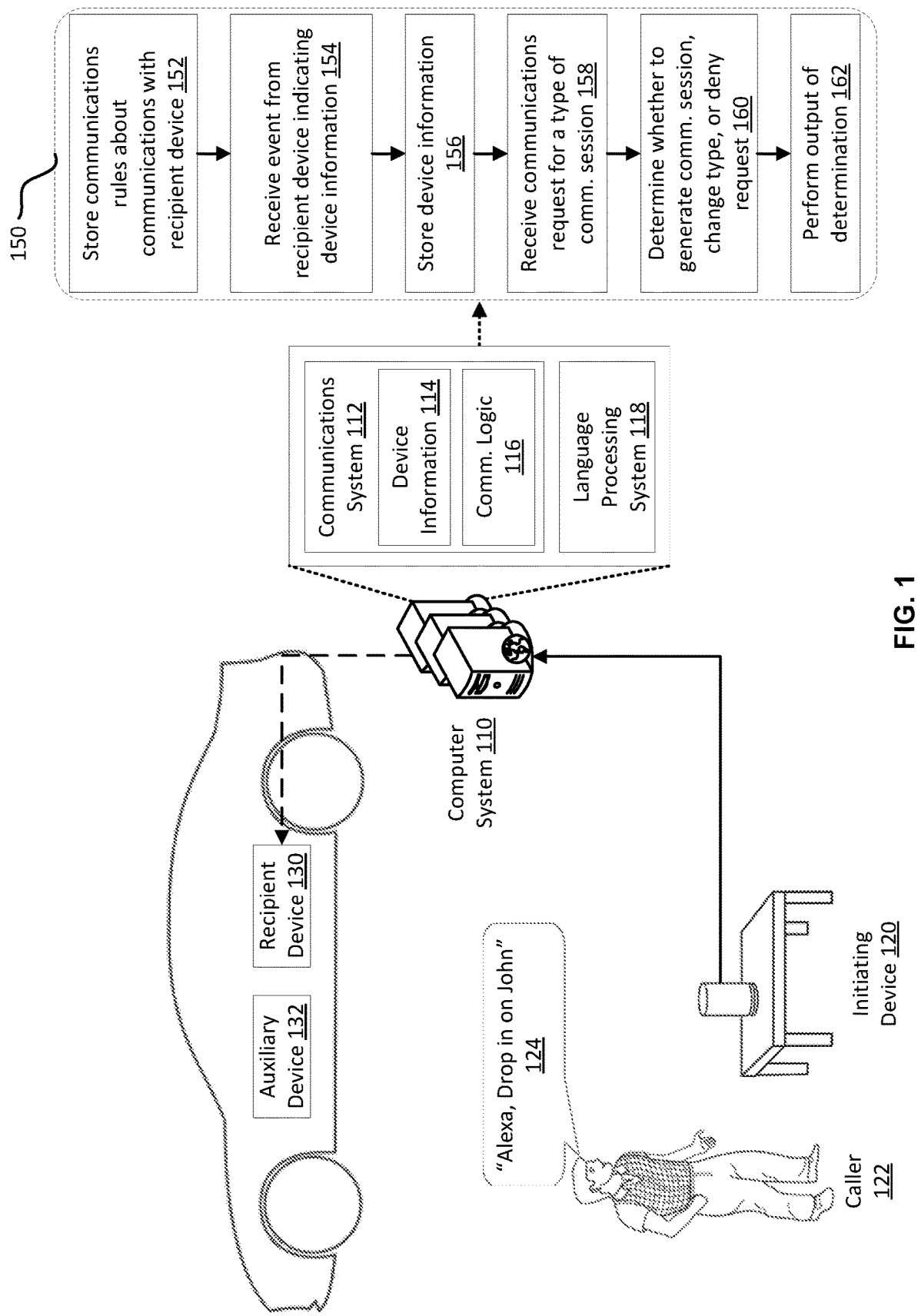
FIG. 1 shows an illustrative diagram of an exemplary network environment for managing communications between devices, in accordance with various embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed, among other things, to managing communications with devices based on device information. In an example, a computer system supports a capability of an automatically established communications session between an initiating device and a recipient device based on a preset permission to establish the communications session without a user action at the recipient device to manually accept the communications session. Based on contextual data about at least the recipient device, the computer system determines whether the capability should be permitted or prohibited. If permitted, a request of the initiating device for such a type of communications is granted and the communications session between the two devices is established without the user action at the recipient device. If denied, the computer system may not provide an option to the initiating device to make such a request, or if this option is provided, the request is denied and the communications session is not established at least without the user action. Establishing a communications session by a recipient device generally involves setting up an active and secure communications channel with the computer system as an intermediary device and with the initiating device as an endpoint device, where the communications channel is based on a network communications protocol such as one using the Internet protocol suite (TCP/IP).

To illustrate, consider an example of a caller operating a smartphone to communicate with a contact that has two voice-controlled devices (VCDs) associated with the contact's user account. A VCD can represent a smart speaker providing an intelligent personal assistant service responsive to a wakeword (e.g. "Alexa") and capable of different communications tasks, including Drop Ins and Calls (e.g., initiates a Drop In upon an utterance of "Alexa, Drop In on John;" initiates a Call upon an utterance of "Alexa, call John"). A "Drop In" represents the capability of the VCD or any other type of user device to automatically establish synchronous audio communications session without a user of the recipient device needing to manually accept the request to establish the communications session when there is a preset permission enabling automatic acceptance of the request. A "Call" represents the capability of the VCD or any other type of user device to establish a synchronous audio communications session based on a user action at the VCD or other user device manually confirming that this type of communications is permitted (e.g., user answers a Call).

In the illustrative example, a communications system receives from the first VCD contextual data indicating that the first VCD is not in a vehicle. Based on this contextual data and on a permission from the user account to support Drop Ins, the communications system determines that the Drop Ins on the first VCD are permitted and may store a first indication about this determination in the user account. The communication system also receives from the second VCD contextual data indicating that the second VCD is in a vehicle. Based on this contextual data and on a rule prohibiting Drop Ins on vehicles, the communications system determines that Drop Ins on the second VCD is prohibited and may store a second indication about this determination in the user account.

Further, the communications system can update the contact list of the caller based on the indications. When the caller accesses the contact list via the smartphone to initiate a Drop In, the smartphone shows that the first VCD is available for the Drop In. The smartphone can also show that the second VCD is unavailable for the Drop In or may not identify the second VCD under the Drop In contact list altogether. In comparison, when initiating a Call, the smartphone shows to the caller that both the first and second VCDs are available.

The above example is provided for illustrative purposes and the embodiments of the present disclosure are not limited as such. Instead, the embodiments similarly apply to managing communication sessions between user devices (e.g., at least one initiating device and at least one recipient device), where the recipient device may be associated with a capability to automatically establish a communications session based on a preset permission for this type of communications and without the need for a user action at the recipient device to confirm that the communications session should be established.

In particular, a computer system may store, for instance in a user account of a contact, permission data used to establish a type of communications session by one or more recipient devices registered under the user account. The type of communications session is such that a synchronous communications session is established in response to an initiating device requesting the type of communications session with at least one of the one or more recipient devices and without a user action at one of the one or more recipient devices to manually accept the synchronous communications session. The permission data is generated based on a preset permission of the caller, where this preset permission may be received explicitly from the caller and stored in the user account as permission data applicable to all or specific ones of the recipient devices registered under the user account. The preset permission may also be determined implicitly based on previous communications sessions with the initiating device. The computer system may further store a communications rule specifying one or more conditions to permit or prohibit the type of communications session. The communications rule may be stored based on input of the caller, a provider of at least one of the one or more recipient devices, or another entity (e.g., by a vehicle manufacturer for a recipient device installed in a vehicle).

The computer system may also receive and store device information indicating a context of a recipient device. The device information is also referred to herein as contextual data. The contextual data can indicate one or more of a type of the recipient device, a software version of a communications application of the recipient device, and/or an activity context of the recipient device. The activity context may include status information related to exchanging or presenting communications. For example, the status information may indicate whether the recipient device is online or offline, whether the recipient deice is streaming audio data (e.g., music), whether the recipient device is participating in a gaming session, the type of connectivity available to the recipient device (e.g., WiFi, a connection to a home network with which the recipient device is registered, a particular generation of mobile phone communications (4G or 5G)), a mode of operation of the recipient device (e.g., a first mode where the recipient device is operational to access various applications and supports various modalities of user inputs, and a second mode where the recipient device responds to voice commands and presents information on its display), whether the recipient device is in a vehicle or not, a motion status (e.g., in motion or stationary, motion speed), if an auxiliary device is available (e.g., a connected speaker), a type of the auxiliary device (e.g., Bluetooth speaker), and other information related to the capability of establishing a communications session.

Based on the permission data, the communications rule, and the contextual data, the computer system may determine whether the type of communications session should be permitted, modified, or prohibited. For example, the communications rule specifies a condition to prohibit the type of communications session (e.g., if the recipient device is connected to a cellular network instead of a WiFi network or a home network, prohibit the type of communications session). If the contextual data indicates that this condition is satisfied, the type of communications session may be prohibited even when the permission data indicates that the capability is available to the recipient device. In another example, the communications rule specifies a condition to change the type of communications session to a second type that necessitates a user action at the recipient device to establish a communications session (e.g., if the recipient device is in a vehicle and the vehicle is in motion but at a speed lower than a speed threshold, convert a Drop In to a Call). If the contextual data indicates that this condition is satisfied, the communications session may be changed to the second type.

Furthermore, the computer system can receive the contextual data of the recipient device and determine whether the type of the communications session should be permitted, modified, or prohibited independently of a request from the initiating device to establish the type of communications session with the recipient device. The computer system can store an indication of this determination for use when such a request is received or to update the initiating device such that only a request for the an available type of communications session can be made. Additionally or alternatively, the computer system can store the contextual data of the recipient device. Upon receiving a request from the initiating device to establish the type of communications session with the recipient device, the computer system may access the stored contextual data to then determine whether the type of communications session should be permitted, modified, or prohibited and respond to the initiating device.

In the interest of clarity of explanation, various embodiments of the present disclosure are described in connection with Drop Ins to one or more recipient devices, some of which are in a vehicle. However, and as explained herein above, the embodiments of the present disclosure are not limited as such.

FIG. 1 shows an illustrative diagram of an exemplary network environment for managing communications between devices, in accordance with various embodiments. As illustrated, the network environment includes a computer system 110 of a service provider, an initiating device 120, and a recipient device 130. A caller 122 may operate the initiating device 120 to communicate with a contact associated with the recipient device 130. The computer system 110 may receive a communications request and perform a communications task based on device information of the recipient device 130.

The initiating device 120 can be any suitable user device available to the caller 122 and capable of communicating with the recipient device 130 over a data network. Generally, the initiating device 120 is associated with a user account of an operator of the initiating device 120 (e.g., the caller 122). The user account may be registered with the service provider and maintained at the computer system 110. The user account may identify that, for instance, the Drop In capability of the initiating device 120 has been enabled. The user account may also identify the various contacts that can receive a Drop In communications.

In an example, the initiating device 120 is a VCD that includes a microphone(s), a speaker(s), and/or a display(s), or that interfaces with such input/output devices (e.g., via pairing over a wireless communications protocol or via wired connection that uses auxiliary cables). Generally, the VCD hosts an intelligent personal assistant service responsive to a wakeword (e.g. "Alexa") and capable of different communications tasks in response to utterances of the caller 122. The term "wakeword" may correspond to a "keyword" or "key phrase," an "activation word" or "activation words," or a "trigger," "trigger word," or "trigger expression." One exemplary wakeword may be a name, such as the name, "Alexa," however it will be recognized that the any word (e.g., "Amazon"), or series of words (e.g., "Wake Up" or "Hello, Alexa") may alternatively be used as the wakeword. Furthermore, the wakeword may be set or programmed by the caller 122 (or another operator of the initiating device 120), and in some embodiments more than one wakeword (e.g., two or more different wakewords) may be available to activate the initiating device 120. In another example, the initiating device 120 is a mobile phone hosting the intelligent personal assistant service. In this case, the trigger to activate the intelligent personal assistant service may be a wakeword and/or a manual input of the caller 122 (e.g., an interaction with a graphical user interface (GUI) element associated with this service).

Similarly, the recipient device 130 can be any suitable user device capable of communicating with the initiating device 120 over the data network. Generally, the recipient device 130 is associated with a user account of an operator of the recipient device 130 (e.g., the contact that the caller 122 is trying to reach). The user account may be registered with the service provider and maintained at the computer system 110. The user account may identify that, for instance, the Drop In capability of the recipient device 130 has been enabled.

In an example, the recipient device 130 is installed in a vehicle. Different types of installation are possible. For instance, the recipient device 130 can be integrated with a vehicular system (e.g., an infotainment system). In this case, the recipient device 130 can be an communications endpoint, such as a head end unit or a computer server on the vehicle and having access to the data network, where this endpoint may host the intelligent personal assistant service as an application. The recipient device 130 can also be connected with an auxiliary device 132, such as a set of microphones, a set of speakers and/or a set of displays, where this auxiliary device 132 may interface with the recipient device 130 via wireless and/or wired connection(s). In another illustration, the recipient device 130 can interface with the vehicular system without being integrated therewith. For instance, the recipient device 130 may be a standalone communications endpoint (e.g., a VCD) and can interface with an auxiliary device 132 of the vehicular system via wireless or wired connection(s). This standalone communication endpoint may access the data network independently of the computer server of the vehicle (e.g., via a mobile device of the caller). In yet another illustration, the recipient device 130 can be a mobile device hosting the intelligent personal assistant service. Here also, the mobile device can interface with an auxiliary device 132 of the vehicular system via wireless or wired connection(s).

The computer system 110 may be implemented as a set of computer servers or set of virtual instances hosted on computer hardware configured to manage the communications between devices. Communications management may include determining whether to initiate and, accordingly, initiating a communications session between the devices, routing data between the devices over the communications session, and determining whether to terminate and, accordingly, terminating the communications session among other functionalities.

In an example, the computer system 110 includes a communications system 112 and a language processing system 118. These two systems 112 and 118 are further illustrated in FIG. 2. The language processing system 118 can receive audio data from the initiating device 120 indicating an utterance of the caller 122, and process this data to determine an intent of the caller 122. If the intent indicates a communications request to establish a communication session for a particular type of communications (e.g., an audio Drop In) with the recipient device 130, the communications system 112 can determine whether to allow or deny the communications request based on device information 114 of the recipient device 130 and communications logic 116 applicable to the recipient device 130, and initiate the proper communications task.

In an example, computer system 110 may receive and store the device information 114 from the recipient device in a data store (e.g., a database). When the recipient device 130 is online (e.g., currently streaming music, on a call, etc.), a communications session with the computer system 110 may be ongoing and the recipient device 130 may report its device information 114 in this session. The device information 114 is associated in the data store with the user account of the recipient device 130 such that this information 114 can be looked up based on an identifier of the recipient device 130 and/or the user account.

The device information 114 includes a device type identifier (e.g., identifying the type of the recipient device 130, such as whether integrated with a vehicular system, a standalone device, or a mobile phone), an identifier of the software version (e.g., the version of the intelligent personal assistant service hosted by the recipient device 130), and an activity context of the recipient device 130.

The communications logic 116 may include a set of communications rules specifying one or more communications tasks that should be performed given the device information 114. Generally, the set of communications rules specifies the particular communications task that would result in a desired type of communications (or lack thereof), such as in a safe or user preferred type of communications. The communications logic 116 can be defined based on input of a vehicle manufacturer, the service provider, or an operator of the recipient device 130. Further, the communications logic 116 is associated with the user account of the recipient device 130, with the device type identifier and/or the software version such that this logic 116 can be applied to the device information 114.

An example of a communications task includes allowing the communications request, establishing the communications session, and routing the audio exchange according to the requested communications type (e.g., audio Drop In). Another example of a communications task includes denying the communications request, not establishing the communications session, and informing the initiating device 120 of the denial. In this example, upon a change to the device information 114 indicating that the communications request would now be allowed, the communications task may include informing the recipient device 130 of the previous denial. Yet another example of a communications task includes converting the communications request to a different type of communications (e.g., from a Drop In to a Call) and informing the initiating device 120 of the conversion. In this example, the conversion can be automatic. Alternatively, this communications task can also provide an option to the initiation device 120 for manually accepting the conversion. Another example of a communications task includes requesting the recipient device 130 to update its functionalities (e.g., to update its software version to support Drop In capability).

In an example, upon receiving the device information 114, the communications system 112 may run the communications logic 116 to determine, based on the device information 114, the communications task(s) that are available. The task(s) indicate the communications capabilities available to the recipient device 130 (e.g., whether a Drop In is permitted, prohibited, or should be modified to a Call). The communications system 112 may store this indication in the data store or under the contact's user account.

As illustrated, the caller 122 operates the initiating device 120 for a Drop In. For instance, the initiating device 120 receives the caller's 122 utterance of "Alexa, Drop in John" (or any other spoken words, statement, or audio indicating a communications request to use the Drop In capability of the initiating device 120 in connection with a particular contact of the caller). Upon detecting the wakeword ("Alexa"), the initiating device 120 may package and send audio data representing the utterance to the language processing system 118.

Upon receiving the audio data, language processing system 118 may apply automatic speech recognition (ASR) processing to the audio data to generate text data. ASR processing can also perform speech identification analysis to the audio data in an attempt to identify the individual speaking (which can be used to look-up their user account and contacts under their user accounts). The text data can be provided for natural language understanding (NLU) processing that analyzes the text data in order to determine the intent of the spoken utterance, which can be provided as intent data. For example, using text data representing the received audio data, NLU processing may compare the structure of the utterance to various sample utterances in an attempt to match the spoken utterance to one of the sample utterances. For example, NLU processing may determine that the caller's 122 utterance has a format of "{Wakeword}, {Start Communications Session} {Contact Name}," and may identify the elements of utterance based on the determined format. For instance, the NLU processing may determine that the intent of this utterance is for a communications session to be started with one of the caller's 122 contacts having the name "John."

The communications system 112 may determine a contact named John from a user account associated with the caller 122. This user account may be determined in different ways. For instance, the user account may correspond to the account under which the initiating device 122 is registered. In another illustration, the caller 122 may be identified based on the ASR processing and the caller's 122 identifier may be used to look up the caller's 122 user account. The user account may include a contact list identifying John as a contact and including a unique identifier of the recipient device 130 (e.g., its media access control (MAC) address). If this contact is associated with multiple recipient devices, the communications system 112 may select the recipient device 130 based on presence information related to the contact.

In particular, if the presence information indicates that the contact is most likely in proximity of the recipient device 130 rather than the other recipient devices, the communications system 112 selects this recipient device 130. Different types of presence information are possible including current use information, most recent use information, most frequent use information, and user preferences. For instance, if the recipient device 130 is currently in use, was the most recently used, is most frequently used, and/or is the preferred device of the contact, the communications system 112 may select it accordingly.

In another example, the utterance of the caller 122 identifies the recipient device 130 instead of the contact (e.g., the utterance is for "Alexa, Drop in John's Car"). Here, a similar processing may be applied to determine from the contacts and the user account the unique identifier of the recipient device 130.

Upon identifying the recipient device 130, the communications system 112 may look-up the indication about the available communications task(s) for the recipient device 130 (or, similarly, the available capability or capabilities of the recipient device 130), and initiate such communications task(s). Additionally or alternatively, the communications system 112 may look-up the device information 114 applicable of the recipient device 130 from the data store, run the communications logic 116 to determine, based on the device information 114, the communications task(s) that should be performed, and initiate the communications task(s). A communications task can be initiated as a directive that includes a set of commands and/or data that allow the initiating device 120 and the recipient device 130 to exchange communications, notify their respective users of the communications (or lack thereof) by playing a text-to-speech (TTS) message or audio and/or by updating a graphical user interface, convert between communications types, and/or update the software version.

FIG. 1 illustrates aspect of this management of the communications by the communications system 112 under a process 150. In an example, the process 150 starts at operation 152, where the communications system 112 stores communication rules about communications with the recipient device 130. For instance, the communications rules are defined based on input(s) of the vehicle manufacturer, the service provider, and/or the operator of the recipient device 130. These rules can be stored as the communications logic 116. At operation 154, the communications system 112 receives an event from the recipient device indicating the device information 114. At operation 156, the communications system 112 stores the device information. At this point, the communications system 112 can also run the logic to determine the available capabilities of the recipient device 130 (e.g., whether Drop Ins are permitted, prohibited, or should be converted to Calls) and store an indication about the available capabilities. At operation 158, the communications system 112 receives a communications request from the initiating device 120 for a type of a communications session. For instance, upon receiving the caller's 122 utterance, the language processing system 118 may pass information to the communications system identifying the initiating device 120 (e.g. its MAC address), the user account of the initiating device 120 and/or the caller 122, identifying the contact, and identifying that a request for a Drop In was made. At operation 160, the communications system 112 determines whether to generate a communications session of the requested type, to change the communications session to a different type, or to deny the request. For instance, the communications system 112 identifies the recipient device 130 based on the identified contact, a contact list of the caller 122 (or under the user account of the initiating device 120), and presence information of the identified contact. Once identified, the communications system 112 may perform the determination on the stored indication about the available capabilities of the recipient device 130. Additionally or alternatively, the communications system 112 performs this determination in response to the request by retrieving the device information 114 and communications logic 116 applicable to the recipient device 130, running the communications logic 116, and determining a particular communications task(s) that should be performed given the device information 114. At operation 162, the communications system 112 may perform the output of the determination from operation 160 by, for instance, initiating the corresponding directives.

The following use cases are provided for illustrative purposes. Additional use cases are similarly possible based on the specific device information 114 and the communications logic 116.

In a first use case, the recipient device 130 is integrated with the vehicular system. The communications logic 116 denies all Drop Ins to recipient devices integrated with vehicular systems. In this example, the communications system 112 may determine the device type identifier from the device information 114. This identifier may indicate that the type of the recipient device corresponds to a device integrated with a vehicular system. Accordingly, if a request for a Drop In to the recipient device 130 is made, the communications system 112 may deny the Drop In. Additionally or alternatively, communications system 112 may not provide the initiating device 120 the option to make such a request in the first place.

In a second use case of a vehicular system integration, the communications logic 116 allows Drop Ins if a vehicle is stationary, prohibits Drop Ins if the vehicle is in motion over a speed threshold, and converts Drop Ins to Calls if the vehicle is in motion at a speed lower than the speed threshold. The communications system 112 receives the device information 114 and determines a specific device type identifier and a specific software version. The communications logic 116 may indicate that Drop Ins are not supported for that software version on that type of device. Accordingly, the communications system 112 may send an update directive to the recipient device 130 to update its software version. Upon receiving the update directive, the recipient device 130 may download the latest software version from the computer system 110. After the software update, updated device information is received indicating that recipient device 130 can support the Drop In. If the updated device information indicates that the vehicle is stationary, the communications system 112 stores an indication that Drop Ins are permitted, or determines in real-time that a Drop In request should be allowed. In response to such a request, the communications system 112 establishes a communications session between the initiating device 120 and the recipient device 130 and sends a Drop In directive to the recipient device 130 for automatically starting the communications exchange with the initiating device 120 over the communications session. However, if the vehicle was in motion over the speed threshold, the communications system 112 the communications system 112 stores an indication that Drop Ins are prohibited, or determines in real-time that the Drop In request should be denied. Accordingly, in response to such a request, the communications system 112 does not establish the communications session and sends the denial directive to the initiating device 120. On the other hand, if the motion is slower than the speed threshold, the communications system 112 stores an indication that Drop Ins should be converted to Calls, or determines in real-time that the Drop In request should be converted to a Call request. In response to such a request, the communications system 112 establishes a communications session between the initiating device 120 and the recipient device 130, sends a Call directive to the recipient device 130, and an update directive to the initiating device 120 about the conversion.

In a third use case, the recipient device 130 is not integrated with the vehicular system. Instead, the recipient device 130 is a communications endpoint (e.g., a standalone device or a mobile phone) that interfaces with an auxiliary device 132 of the vehicular system. In this third use case, the communications logic 116 may deny Drop Ins to any recipient device interfacing with a vehicular system. Upon receiving the device information 114, the communications system 112 determines that the recipient device is paired with a Bluetooth speaker of the vehicle. Accordingly, if a request for a Drop In to the recipient device 130 is made, the communications system 112 may deny the Drop In. Additionally or alternatively, the communications system 112 may not provide the initiating device 120 the option to make such a request in the first place.

In yet another use case of a non-vehicular integration, the device information 114 further identifies the connectivity status of the auxiliary device 132 and the communications logic 116 indicates that the Drop In is allowed at low speed when the auxiliary device 132 is available (e.g., is powered on and connected to the communications endpoint). In this use case, upon determining from the device information 114 that the vehicle is in motion at a speed slower than the speed threshold while the auxiliary device 132 is available, the communications system 112 may allow Drop Ins to the recipient device 130.

In another use case, the device information 114 identifies the connectivity type of the recipient device (e.g., whether connected to a cellular network or to a WiFi network, or whether connected to a home network with which the recipient device is registered or not). The communications logic 116 indicates that Drop Ins are allowed when the connection is to a WiFi network and/or to a home network and should be denied otherwise. In this use case, the communications system 112 sets an indication to permit to prohibit the Drop Ins if the recipient device 130 is connected to the cellular network. The communications system 112 sets or updates this indication to permit the Drop Ins if the recipient device 130 is connected to the WiFi network and/or the home network. Additionally or alternatively, the determination to permit or prohibit a Drop In based on the connectivity type may be performed in real-time based on a request from the initiating device 120 for the Drop In.

As described in connection with FIG. 1, Drop In, Call, and Announcement capabilities (where an "Announcement" represents the of the recipient device 130 to receive and automatically play broadcasted communications originating from the initiating device 120 and sent to one or more recipient devices) can be managed depending on the device information 114 and the communications logic 116 applicable to the recipient device 130. These capabilities include routing audio data between the initiating device 120 and the recipient device 130. However, the embodiments of the present disclosure are not limited as such and similarly apply to routing video data and/or other multimedia data. For example, similar communications logic can be defined to manage video data and/or multimedia data communications. Further, the communications logic can distinguish between the types of communications and manage them differently. For instance, the communications logic 116 may indicate that if the vehicle is stationary, audio and video communications are allowed. If the vehicle is in motion, video communications are prohibited and audio Drop Ins are only allowed for low speed motion (e.g., slower than a speed threshold).

Figure 2:
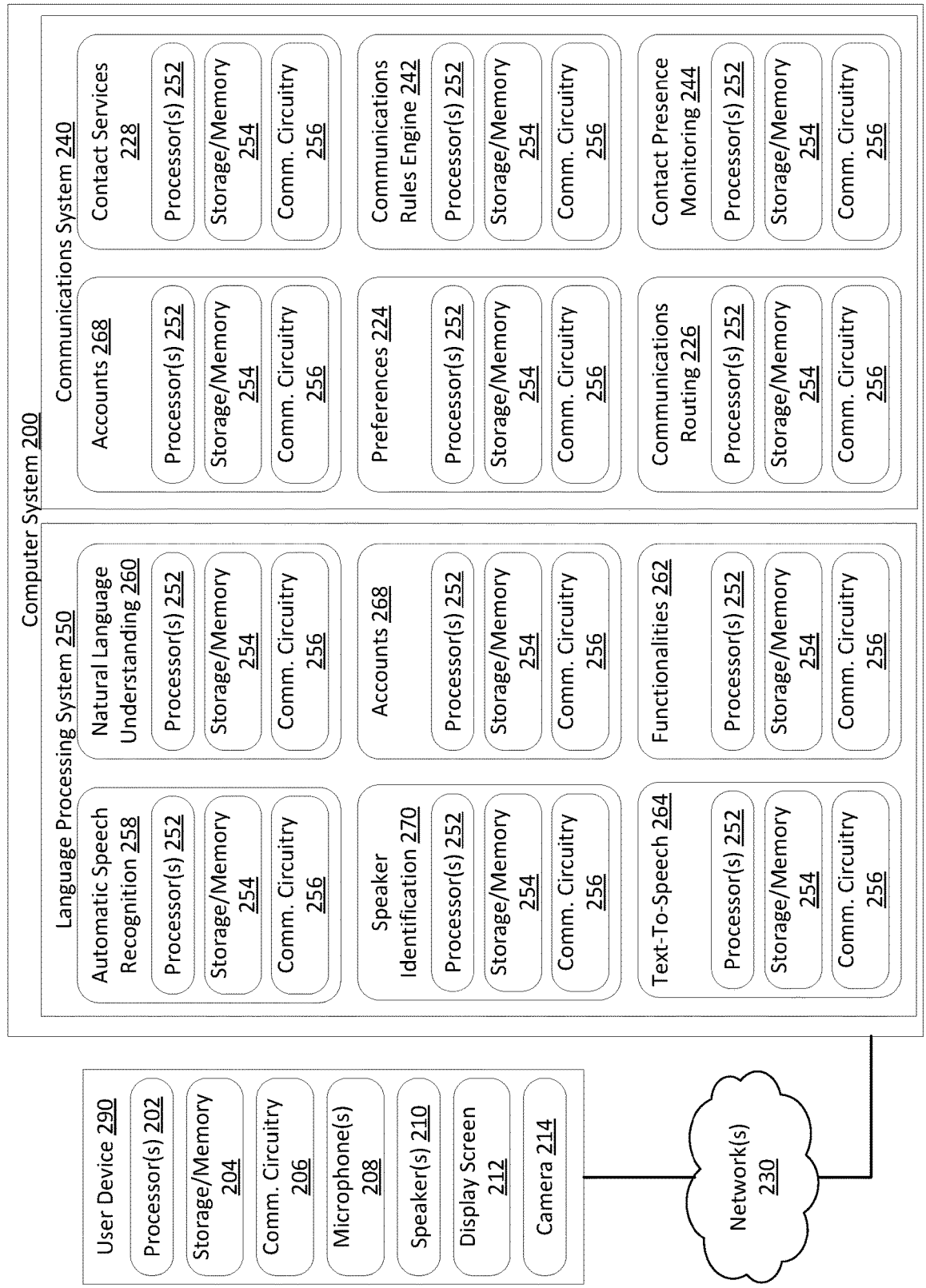
FIG. 2 shows an illustrative diagram of the exemplary system architecture of FIG. 1, in accordance with various embodiments.

FIG. 2 shows an illustrative diagram of an exemplary system architecture, in accordance with various embodiments. As illustrated, a user device 290 may be configured to communicate with a computer system 200, and in particular with a language processing system 250, in response to detecting an utterance including a wakeword, which may subsequently be followed by a request/question/statement. Similarly, the user device 290 may alternatively or additionally include one or more manually activated components for manually activated capabilities. In this particular scenario, the user device 290 may also be configured, in some embodiments, to communicate with the language processing system 250, in response to a manual input being detected by one or more input mechanisms, such as a touch screen, a button, and/or a switch, for example. The computer system 200 is one example of the computer system 110 of FIG. 1. The user device 290 is usable to initiate and receive communications. When initiating communications, the user device 290 represents an example of the initiating device 120 of FIG. 1. When receiving communications, the user device 290 represents an example of the recipient device 130 of FIG. 1.

In non-limiting embodiments, the user device 290 may be capable of being activated in response to detecting a specific sound, such as a wakeword. After detecting a specific sound (e.g., a wakeword or trigger expression), the user device 290 may recognize commands (e.g., audible commands, inputs) within captured audio, and may perform one or more actions in response to the received commands. Furthermore, the user device 290 may also be configured to perform one or more actions in response to detecting a particular touch, or mechanical, input(s) via the user device 290.

The user device 290 may correspond to any suitable type of electronic device including, but are not limited to, desktop computers, mobile computers (e.g., laptops, ultrabooks), mobile phones, smart phones, tablets, televisions, set top boxes, smart televisions, personal display devices, large scale display devices, personal digital assistants ("PDAs"), gaming consoles and/or devices, smart furniture, smart household devices (e.g., refrigerators, microwaves, etc.), smart vehicles (e.g., cars, trucks, motorcycles, etc.), smart transportation devices (e.g., ships, trains, airplanes, etc.), wearable devices (e.g., watches, pins/broaches, headphones, etc.), and/or smart accessories (e.g., light bulbs, light switches, electrical switches, etc.). In some embodiments, the user device 290 may be relatively simple or basic in structure such that no, or a minimal number of, mechanical input option(s) (e.g., keyboard, mouse, track pad) or touch input(s) (e.g., touch screen, buttons) are included. For example, the user device 290 may be able to receive and output audio, and may include power, processing capabilities, storage/memory capabilities, and communication capabilities. However, in other embodiments, the user device 290 may include one or more components for receiving mechanical inputs or touch inputs, such as a touch screen and/or one or more buttons.

The user device 290, in some embodiments, may include a minimal number of input mechanisms (e.g., a power on/off switch) such that functionality of the user device 290 may solely or primarily be through audio input and audio output. For example, the user device 290 may include, or be in communication with, one or more microphones that listen for a wakeword by continually monitoring local audio. In response to the wakeword being detected, the user device 290 may establish a connection with the language processing system 250 (such as through a network(s) 230), send audio data to the language processing system 250, and await/receive a response from the language processing system 250. In some embodiments, however, non-voice/sound activated devices may also communicate with the language processing system 250 (e.g., push-to-talk devices). For example, in response to a button or touch screen being pressed, or a button or touch screen being pressed and held, a microphone associated with the user device 290 may begin recording local audio, establish a connection with the language processing system 250, send audio data representing the captured audio to the language processing system 250, and await/receive a response, and/or action to be occur, from the language processing system 250.

It may be recognized that although in the illustrative embodiment shown in FIG. 2, the computer system 200 includes the language processing system 250, this is merely exemplary, and the language processing system 250 may be separate from the computer system 200. For example, the language processing system 250 may be located within a dedicated computing device (such as one or more separate server(s), or within the user device 290) or computing system, which may or may not be in communication with the computer system 200 and/or one or more additional devices.

The user device 290 may include one or more processors 202, storage/memory 204, communications circuitry 206, one or more microphones 208 or other audio input devices (e.g., transducers), one or more speakers 210 or other audio output devices, a display screen 212, and one or more cameras 214 or other image capturing components. However, one or more additional components may be included within the user device 290, and/or one or more components may be omitted. For example, the user device 290 may also include a power supply or a bus connector. As still yet another example, the user device 290 may include one or more additional input and/or output mechanisms, such as one or more buttons, or one or more switches or knobs. Furthermore, while the user device 290 may include multiple instances of one or more components, for simplicity only one of each component has been shown.

In some embodiments, the user device 290 may correspond to a manually activated device, or may include the functionality of a manually activated device. A manually activated device, as described herein, may correspond to a device that is capable of being activated in response to a manual input (e.g., pressing a button, touching a portion of a touch screen, performing an action on a device). For example, a tap-to-talk device is one type of manually activated device. Such tap-to-talk devices, for instance, are capable of obtaining and outputting audio data in response to a button being pressed.

In some embodiments, the user device 290 may be in communication with an additional processing device including one or more of: processor(s) 202, storage/memory 204, communications circuitry 206, microphone(s) 208, speaker(s) 210, display screen 212, and/or camera(s) 214. For example, a centralized control device of the user device 290 may include one or more microphone(s) 208. These microphone(s) 208 may receive audio input signals, which in turn may be sent to the language processing system 250 in response to a wakeword engine of the user device 290 determining that a wakeword was uttered.

The processor(s) 202 may include any suitable processing circuitry capable of controlling operations and functionality of the user device 290, as well as facilitating communications between various components within the user device 290. In some embodiments, the processor(s) 202 may include a central processing unit ("CPU"), a graphic processing unit ("GPU"), one or more microprocessors, a digital signal processor, or any other type of processor, or any combination thereof. In some embodiments, the functionality of the processor(s) 202 may be performed by one or more hardware logic components including, but not limited to, field-programmable gate arrays ("FPGA"), application specific integrated circuits ("ASICs"), application-specific standard products ("ASSPs"), system-on-chip systems ("SOCs"), and/or complex programmable logic devices ("CPLDs"). Furthermore, each of the processor(s) 202 may include its own local memory, which may store program systems, program data, and/or one or more operating systems. However, the processor(s) 202 may run an operating system ("OS") for the user device 290, and/or one or more firmware applications, media applications, and/or applications resident thereon. In some embodiments, the processor(s) 202 may run a local client script for reading and rendering content received from one or more websites. For example, the processor(s) 202 may run a local JavaScript client for rendering HTML or XHTML content received from a particular URL accessed by the user device 290.

The storage/memory 204 may include one or more types of storage mediums such as any volatile or non-volatile memory, or any removable or non-removable memory implemented in any suitable manner to store data for the user device 290. For example, information may be stored using computer-readable instructions, data structures, and/or program systems. Various types of storage/memory may include, but are not limited to, hard drives, solid state drives, flash memory, permanent memory (e.g., ROM), electronically erasable programmable read-only memory ("EEPROM"), CD-ROM, digital versatile disk ("DVD") or other optical storage medium, magnetic cassettes, magnetic tape, magnetic disk storage or other magnetic storage devices, RAID storage systems, or any other storage type, or any combination thereof. Furthermore, the storage/memory 204 may be implemented as computer-readable storage media ("CRSM"), which may be any available physical media accessible by processor(s) 202 to execute one or more instructions stored within the storage/memory 204. In some embodiments, one or more applications (e.g., gaming, music, video, calendars, lists, etc.) may be run by the processor(s) 202, and may be stored in the memory 204.

In some embodiments, the storage/memory 204 may include a media system, which may be configured to facilitate communications between the user device 290 and the computer system 200. For example, the media system may store one or more communications protocols that may be executed by the processor(s) 202 for facilitating communications for the user device 290. In some embodiments, a sessions initiation protocol ("SIP") may be used to facilitate media transfer between the user device 290 and one or more of the computer system and a second user device 290. SIP, for example, is an application layer protocol that is text based, and may employ Real-time Transport Protocol ("RTP") or Secure Real-time Transport Protocol ("SRTP") functions. In particular, PJSIP communications functionality may be employed to support audio, video, presence, and messaging communications for the user device 290. In some embodiments, a Web Real-Time Communications ("WebRTC") protocols may be employed by the user device 290. In a non-limiting embodiment, the media system may include instructions that indicate which communications protocols to employ for facilitating media transfer between devices based on a device type of the user device 290. For example, if the user device 290 does not include the display 212 and/or camera 214, the media system may indicate that PJSIP should be used, whereas if the user device 290 includes the display 212 and/or camera 214, the media system may indicate that WebRTC protocols should be used.

In some embodiments, the storage/memory 204 may include one or more systems and/or databases, such as a speech recognition system, a wakeword database, a sound profile database, and a wakeword detection system. The speech recognition system may, for example, include an automatic speech recognition ("ASR") component 258 that recognizes human speech in detected audio signals and converts the audio signals to text data. The speech recognition system may also include a natural language understanding ("NLU") component 260 that determines user intent based on the text data it receives from ASR. Also included within the speech recognition system may be a text-to-speech ("TTS") component 264 that is capable of converting text to speech to be outputted by the speaker(s) 210 in the user device 290, and/or a speech-to-text ("STT") component capable of converting received audio signals into text to be sent to the language processing system 250 for processing.

The wakeword database may be a database stored locally by the storage/memory 204 of the user device 290, and may include a list of a current wakewords for the user device 290, as well as one or more previously used, or alternative, wakewords for the voice activated user device 290. In some embodiments, an individual may set or program a wakeword for their user device 290. The wakeword may be programmed directly on the user device 290, or a wakeword or wakewords may be set by the individual via a local client application that is in communication with computer system 200 and/or language processing system 250. For example, an individual may use their mobile device having the speech-processing system application running thereon to set the wakeword. The specific wakeword may then be communicated from the mobile device to the language processing system 250, which in turn may send/notify the user device 290 of the individual's selection for the wakeword. The selected activation may then be stored in the wakeword database of the storage/memory 204. In some embodiments, additional trigger expressions or permutations of the wakeword may also be stored within the storage/memory 204. For example, specific trigger expressions or words that indicate the presence of the wakeword may also be stored within the storage/memory 204. In some embodiments, audio watermarks, indicating a specific action or message, may also be stored within the storage/memory 204.

In some embodiments, sound profiles for different words, phrases, commands, or audio compositions are also capable of being stored within the storage/memory 204, such as within a sound profile database. For example, a sound profile of audio may be stored within the sound profile database of the storage/memory 204 on the user device 290. In this way, if a particular sound (e.g., a wakeword or phrase) is detected, a corresponding command or request may be ignored, for example. A sound profile, for example, may correspond to a frequency and temporal decomposition of a particular audio file or audio portion of any media file, such as an audio fingerprint or spectral representation.

The wakeword detection system may include an expression detector that analyzes an audio signal produced by the microphone(s) 208 to detect a wakeword, which generally may be a predefined word, phrase, or any other sound, or any series of temporally related sounds. Such an expression detector may be implemented using keyword spotting technology, as an example. A keyword spotter is a functional component or algorithm that evaluates an audio signal to detect the presence of a predefined word or expression within the audio signal detected by the microphone(s) 208. Rather than producing a transcription of words of the speech, a keyword spotter generates a true/false output (e.g., a logical I/O) to indicate whether or not the predefined word or expression was represented in the audio signal. In some embodiments, an expression detector may be configured to analyze the audio signal to produce a score indicating a likelihood that the wakeword is represented within the audio signal detected by the microphone(s) 208. The expression detector may then compare that score to a wakeword threshold to determine whether the wakeword will be declared as having been spoken.

In some embodiments, a keyword spotter may use simplified ASR techniques. For example, an expression detector may use a Hidden Markov Model ("HMM") recognizer that performs acoustic modeling of the audio signal and compares the HMM model of the audio signal to one or more reference HMM models that have been created by training for specific trigger expressions. An HMM model represents a word as a series of states. Generally, a portion of an audio signal is analyzed by comparing its HMM model to an HMM model of the trigger expression, yielding a feature score that represents the similarity of the audio signal model to the trigger expression model.

In practice, an HMM recognizer may produce multiple feature scores, corresponding to different features of the HMM models. An expression detector may use a support vector machine ("SVM") classifier that receives the one or more feature scores produced by the HMM recognizer. The SVM classifier produces a confidence score indicating the likelihood that an audio signal contains the trigger expression. The confidence score is compared to a confidence threshold to make a final decision regarding whether a particular portion of the audio signal represents an utterance of the trigger expression (e.g., wakeword). Upon declaring that the audio signal represents an utterance of the trigger expression, the user device 290 may then begin transmitting the audio signal to the language processing system 250 for detecting and responds to subsequent utterances made by an individual.

In some embodiments, the storage/memory 204 may store voice biometric data associated with one or more individuals. For example, an individual that operates the user device 290 may have a registered user account on the computer system 200 (e.g., within accounts system 268). In some embodiments, the user device 290 may be associated with a group account, and various individuals may have user accounts that are operating under the rules and configurations of the group account. As an illustrative example, an initiating user device 290 (e.g., the initiating device 120 of FIG. 1) may be associated with a first group account on the computer system 200, the first group account being for a family that lives at a household where first shared electronic device is located. Each family member may also have a user account that is linked to the first group account (e.g., a parent, a child, etc.), and therefore each user account may obtain some or all of the rights of the first group account. For example, the user device 290 may have a first group account on the computer system 200 registered to a particular family or group, and each of the parents and children of the family may have their own user account registered under the parent's registered account. In one illustrative embodiment, voice biometric data for each individual may be stored by that individual's corresponding user account. The voice biometric data, for instance, may correspond to a "voice print" or "voice model" of a particular individual, which may be a graphical representation of a person's voice including a frequency decomposition of that individual's voice.

Upon receiving audio data representing an utterance, a voice print of that audio data may be generated using speaker identification functionality stored within the storage/memory 204. The voice print of the utterance may indicate the different frequency components of the spoken words over time as the utterance was spoken. The generated voice print may then be compared to a previously generated voice print, which may be referred to as a reference voice print, specific to a particular individual's speech. A difference between the generated voice print and the reference voice print may be determined and, if the difference is less than or equal to a predefined threshold value, then the two voice prints may be declared as corresponding to a same individual's voice indicating that that individual spoke the utterance. If the difference is larger than the predefined threshold value, then the generated voice print may be said to be unassociated with the individual's voice, and therefore may indicate that the individual did not speak the utterance. In some embodiments, the speaker identification functionality may compare any generated voice print to one or more reference voice prints in order to try and find a match. Therefore, for each individual's user account associated with a group account, voice biometric data (e.g., a voice print) for that particular individual may be included. This may allow user device 290 to attempt and identify a speaker of a particular utterance locally. However, persons of ordinary skill in the art will recognize that the user device 290 may not perform speaker identification processing, and alternatively speaker identification processing may be performed by the computer system 200 (e.g., a speaker identification system 270), or no speaker identification processing may be performed all together.

The communications circuitry 206 may include any circuitry allowing or enabling one or more components of the user device 290 to communicate with one another, or with one or more additional devices, servers, and/or systems. For example, the communications circuitry 206 may facilitate communications between the user device 290 and the computer system 200. As an illustrative example, audio data representing an utterance may be transmitted over the network(s) 230, such as the Internet, to the computer system 200 using any number of communications protocols. For example, the network(s) 230 may be accessed using Transfer Control Protocol and Internet Protocol ("TCP/IP") (e.g., any of the protocols used in each of the TCP/IP layers), Hypertext Transfer Protocol ("HTTP"), WebRTC, SIP, and wireless application protocol ("WAP"), are some of the various types of protocols that may be used to facilitate communications between the user device 290 and the computer system 200. In some embodiments, the user device 290 and computer system 200 and/or one or more additional devices or systems (e.g., the language processing system 250) may communicate with one another via a web browser using HTTP. Various additional communication protocols may be used to facilitate communications between the user device 290 and computer system 200, including, but not limited to, Wi-Fi (e.g., 802.11 protocol), Bluetooth, radio frequency systems (e.g., 900 MHz, 1.4 GHz, and 5.6 GHz communications systems), cellular networks (e.g., GSM, AMPS, GPRS, CDMA, EV-DO, EDGE, 3GSM, DECT, IS-136/TDMA, iDen, LTE or any other suitable cellular network protocol), infrared, BitTorrent, FTP, RTP, RTSP, SSH, and/or VOIP.

The communications circuitry 206 may use any communications protocol, such as any of the previously mentioned exemplary communications protocols. In some embodiments, the user device 290 may include an antenna to facilitate wireless communications with a network using various wireless technologies (e.g., Wi-Fi, Bluetooth, radiofrequency, etc.). In yet another embodiment, the user device 290 may include one or more universal serial bus ("USB") ports, one or more Ethernet or broadband ports, and/or any other type of hardwire access port so that the communications circuitry 206 allows the user device 290 to communicate with one or more communications networks.

The user device 290 may also include one or more microphones 208 and/or transducers. Furthermore, one or more microphones located within a separate device may be in communication with the user device 290 to capture sounds for the user device 290. The Microphone(s) 208 may be any suitable component capable of detecting audio signals. For example, the microphone(s) 208 may include one or more sensors for generating electrical signals and circuitry capable of processing the generated electrical signals. In some embodiments, the microphone(s) 208 may include multiple microphones capable of detecting various frequency levels. As an illustrative example, the user device 290 may include multiple microphones (e.g., four, seven, ten, etc.) placed at various positions about the user device 290 to monitor/capture any audio outputted in the environment where the user device 290 is located. The various microphones 208 may include some microphones optimized for distant sounds, while some microphones may be optimized for sounds occurring within a close range of the user device 290. In some embodiments, the microphone(s) 208 may only begin to detect audio signals in response to a manual input to user device 290. For example, a manually activated device may begin to capture audio data using the microphone(s) 208 in response to a user input, such as pressing a button, tapping a touch screen, or providing any touch input gesture to a touch input component.

The user device 290 may include one or more speakers 210. Furthermore, the user device 290 may be in communication with one or more speaker(s) 210. The speaker(s) 210 may correspond to any suitable mechanism for outputting audio signals. For example, the speaker(s) 210 may include one or more speaker units, speaker housings, transducers, arrays of speakers, and/or arrays of transducers that may be capable of broadcasting audio signals and or audio content to a surrounding area where user device 290 may be located. In some embodiments, the speaker(s) 210 may include headphones or ear buds, which may be wirelessly wired, or hard-wired, to the user device 290, that may be capable of broadcasting audio directly to an individual.

In some embodiments, the one or more microphones 208 may serve as input devices to receive audio inputs. The user device 290, in the previously mentioned embodiment, may then also include the one or more speakers 210 to output audible responses. In this manner, the user device 290 may function solely through speech or audio, without the need for any input mechanisms or displays, however this is merely exemplary.

The display screen 212 may correspond to a display device and/or touch screen, which may be any size and/or shape and may be located at any portion of the user device 290. Various types of displays may include, but are not limited to, liquid crystal displays ("LCD"), monochrome displays, color graphics adapter ("CGA") displays, enhanced graphics adapter ("EGA") displays, variable graphics array ("VGA") display, or any other type of display, or any combination thereof. Still further, a touch screen may, in some embodiments, correspond to a display device including capacitive sensing panels capable of recognizing touch inputs thereon. For instance, the display screen 212 may correspond to a projected capacitive touch ("PCT"), screen include one or more row traces and/or driving line traces, as well as one or more column traces and/or sensing lines. In some embodiments, the display screen 212 may be an optional component for the user device 290. For instance, the user device 290 may not include the display screen 212. Such devices, sometimes referred to as "headless" devices, may output audio, or may be in communication with a display device for outputting viewable content.

The display screen 212, in one non-limiting embodiment, may include an insulator portion, such as glass, coated with a transparent conductor, such as indium tin oxide ("InSnO" or "ITO"). In general, one side of the touch screen display may be coated with a conductive material. A voltage may be applied to the conductive material portion generating a uniform electric field. When a conductive object, such as a human finger, stylus, or any other conductive medium, contacts the non-conductive side, typically an outer surface of the display screen 212, a capacitance between the object and the conductive material may be formed. The processor(s) 202 may be capable of determining a location of the touch screen associated with where the capacitance change is detected, and may register a touch input as occurring at that location.

In some embodiments, the display screen 212 may include multiple layers, such as a top coating layer, a driving line layer, a sensing layer, and a glass substrate layer. As mentioned previously, the glass substrate layer may correspond to an insulator portion, while the top coating layer may be coated with one or more conductive materials. The driving line layer may include a number of driving lines, and the sensing layer may include a number of sensing lines, which are described in greater detail below. Persons of ordinary skill in the art will recognize that one or more additional layers, or spaces between layers, may be included. Furthermore, persons of ordinary skill in the art will recognize that any number of driving lines and sensing lines for driving the line layer and the sensing layer, respectively, may be used.

In some embodiments, the driving lines and the sensing lines of the driving line layer and the sensing line layer, respectively, may form a number of intersection points, where each intersection functions as its own capacitor. Each sensing line may be coupled to a source, such that a charge is provided to each sensing line, and changes in capacitance of a particular driving line and sensing line are detectable thereby. In response to a conductive object being brought proximate, or substantially touching an outer surface of the top coating layer, a mutual capacitance of a particular capacitor (e.g., an intersection point) may reduce in magnitude. In other words, a voltage drop may be detected at a location on the display screen 212 corresponding to where a conductive object contacted display screen 212.

A change in capacitance may be measured to determine a location on the touch screen where the object has contacted the surface. For example, if an individual touches a point on display screen 212, then a corresponding driving line and sensing line that intersect at that point may be identified. A location of the point may have one or more pixels associated with that location, and therefore one or more actions may be registered for an item or items that are displayed at that location. The processor(s) 202 of the user device 290 may be configured to determine which pixels are associated with a particular location point, and which item or items are also displayed at that pixel location. Furthermore, the user device 290 may be configured to cause one or more additional actions to occur to the item or items being displayed on the display screen 212 based on a temporal duration the touch input, and or if one or more additional touch inputs are detected. For example, an object that contacted display screen 212 at a first location may be determined, at a later point in time, to contact the display screen 212 at a second location. In the illustrative example, an object may have initially contacted display screen 212 at the first location and moved along a particular driving line to the second location. In this scenario, a same driving line may have detected a change in capacitance between the two locations, corresponding to two separate sensing lines.

The number of driving lines and sensing lines, and therefore the number of intersection points, may directly correlate to a "resolution" of a touch screen. For instance, the greater the number of intersection points (e.g., a greater number of driving lines and sensing lines), the greater precision of the touch input. For instance, a touch screen display screen 212 having 100 driving lines and 100 sensing lines may have 100 intersection points, and therefore 100 individual capacitors, while a touch screen display screen 212 having 10 driving lines and 10 sensing lines may only have 10 intersection points, and therefore 10 individual capacitors. Therefore, a resolution of the touch screen having 100 intersection points may be greater than a resolution of the touch screen having 10 intersection points. In other words, the touch screen having 100 intersection points may be able to resolve a location of an object touching the touch screen with greater precision than the touch screen having 10 intersection points. However, because the driving lines and sensing lines require a voltage to be applied to them, this may also mean that there is a larger amount of power drawn by the user device 290, and therefore the fewer driving lines and/or sensing lines used, the smaller the amount of power that is needed to operate the touch screen display.

In some embodiments, the display screen 212 may correspond to a high-definition ("HD") display. For example, the display screen 212 may display images and/or videos of 720p, 1080p, 1080i, or any other image resolution. In these particular scenarios, the display screen 212 may include a pixel array configured to display images of one or more resolutions. For instance, a 720p display may present a 1024 by 768, 1280 by 720, or 1366 by 768 image having 786,432; 921,600; or 1,049,088 pixels, respectively. Furthermore, a 1080p or 1080i display may present a 1920 pixel by 1080 pixel image having 2,073,600 pixels. However, persons of ordinary skill in the art will recognize that the aforementioned display ratios and pixel numbers are merely exemplary, and any suitable display resolution or pixel number may be employed for the display screen 212, such as non-HD displays, 4K displays, and/or ultra-displays.

In some embodiments, the user device 290 may include one or more cameras 214, corresponding to any suitable image capturing component or components capable of capturing one or more images and/or videos. The camera(s) 214 may, in some embodiments, be configured to capture photographs, sequences of photographs, rapid shots (e.g., multiple photographs captured sequentially during a relatively small temporal duration), videos, or any other type of image, or any combination thereof. In some embodiments, the user device 290 may include multiple the cameras 214, such as one or more front-facing cameras and/or one or more rear facing cameras. Furthermore, the camera(s) 214 may be configured to recognize far-field imagery (e.g., objects located at a large distance away from the user device 290) or near-filed imagery (e.g., objected located at a relatively small distance from the user device 290). In some embodiments, the camera(s) may be high-definition ("HD") cameras, capable of obtaining images and/or videos at a substantially large resolution (e.g., 726p, 1080p, 1080i, etc.). In some embodiments, the camera(s) 214 may be optional for the user device 290. For instance, the camera(s) 214 may be external to, and in communication with, the user device 290. For example, an external camera may be capable of capturing images and/or video, which may then be provided to the user device 290 for viewing and/or processing.

Persons of ordinary skill in the art will recognize that, in some embodiments, the display screen 212 and/or camera(s) 214 may be optional for the user device 290. For instance, the user device 290 may function using audio inputs and outputting audio, and therefore the display screen 212 and/or camera(s) 214 may not be included. Furthermore, in some embodiments, the user device 290 may not include the display screen 212 and/or camera(s) 214, but instead may be in communication with the display screen 212 and/or camera(s) 214. For example, the user device 290 may be connected to a display screen via a Wi-Fi (e.g., 802.11 protocol) connection such that visual content sent to the user device 290 may be sent to the display screen, and output thereby.

In some exemplary embodiments, the user device 290 may include an additional input/output ("I/O") interface. For example, the user device 290 may include one or more input components capable of receiving user inputs. Various types of input components may include, but are not limited to, keyboards, buttons, switches, a mouse, joysticks, or an external controller may be used as an input mechanism for the I/O interface. In some embodiments, the output portion of the I/O interface of the user device 290 may include one or more lights, light emitting diodes ("LEDs"), or other visual indicator(s). Persons of ordinary skill in the art will recognize that, in some embodiments, one or more features of the output portion of the I/O interface may be included in a purely voice activated version of the user device 290. For example, one or more LED lights may be included on the user device 290 such that, when the microphone(s) 208 receive audio, the one or more LED lights become illuminated signifying that audio has been received by the user device 290. In some embodiments, one or more vibrating mechanisms or other haptic features may be included with the user device 290 to provide a haptic response to an individual.

In some embodiments, the user device 290 may include radio-frequency identification ("RFID") functionality and/or near field communication ("NFC") functionality. Furthermore, in some embodiments, the user device 290 may include one or more infrared ("IR") sensors and one or more IR emitters. The IR sensors/emitters may be used to determine depth information. For example, in one embodiment, a distance of an individual from the user device 290 may be determined using the one or more IR sensors/emitters. Depth determination may be performed using any depth determination technique. In some embodiments, a distance between an individual and the user device 290 may be employed as a basis for presenting content with varying density using the display screen 212. For example, when an individual is at a distance A from the user device 290, the user device 290 may display weather data for a current day. However as the user moves closer to the user device 290, such as at a distance B from the user device 290, which may be less than distance A, the user device 290 may display weather data for a current week. For instance, as the individual gets closer to the user device 290, the ability of the individual to see denser content increases, and as the individual moves father away from the user device 290, the individual's ability to see denser content decreases. This, for example, may ensure that the content displayed by the user device 290 is continually relevant and readable by the individual.

The computer system 200, in non-limiting, exemplary embodiments, may include the language processing system 250. However, in other embodiments, the language processing system 250 may be separate from, or in communication with, the computer system 200. Generally, the language processing system 250 may, in some embodiments, include one or more remote devices capable of receiving and sending content from/to one or more electronic device, such as the user device 290. The language processing system 250 may include various components and systems including, but not limited to, automatic speech recognition ("ASR") system 258, natural language understanding ("NLU") system 260, functionalities system 262, text-to-speech ("TTS") system 264, and accounts system 268. In some embodiments, language processing system 250 may also include computer readable media, including, but not limited to, flash memory, random access memory ("RAM"), and/or read-only memory ("ROM"). The language processing system 250 may also include various systems that store software, hardware, logic, instructions, and/or commands for the language processing system 250, such as a speaker identification ("ID") system 270, or any other system, or any combination thereof.

The ASR system 258 may be configured to recognize human speech in audio signals received from the user device 290, such as audio captured by the microphone(s) 208, which may then be transmitted to the language processing system 250. The ASR system 258 may include, in some embodiments, one or more processor(s) 252, storage/memory 254, and communications circuitry 256. The processor(s) 252, storage/memory 254, and communications circuitry 256 may, in some embodiments, be substantially similar to the processor(s) 202, storage/memory 204, and communications circuitry 206, which are described in greater detail above, and the aforementioned descriptions may apply. In some embodiments, the ASR system 258 may include speech-to-text ("STT") system 266. The STT system 266 may employ various speech-to-text techniques. However, techniques for transcribing speech into text are well known in the art and need not be described in further detail herein, and any suitable computer implemented speech to text technique may be used to convert the received audio signal(s) into text, such as SOFTSOUND speech processing technologies available from the Autonomy Corporation, which is headquartered in Cambridge, England, United Kingdom.

The ASR system 258 may include an expression detector that analyzes audio signals received by the language processing system 250, such as the expression detector mentioned above with regards to the user device 290. Such an expression detector may be implemented using keyword spotting technology, as an example. A keyword spotter is a functional component or algorithm that evaluates an audio signal to detect the presence of a predefined word or expression, such as a passphrase or other sound data, within the audio signals. Rather than producing a transcription of words of the speech, a keyword spotter generates a true/false output (e.g., a logical I/O) to indicate whether or not the predefined word or expression was represented in the audio signal. In some embodiments, an expression detector may be configured to analyze the audio signal to produce a score indicating a likelihood that the wakeword or phrase, is represented within the audio signal. The expression detector may then compare that score to a threshold value to determine whether the wakeword or phrase will be declared as having been spoken.

The NLU system 260 may be configured such that it determines user intent based on the text data is receives from the ASR system 258. For example, the NLU system 260 may determine that the intent of utterance is for initiating a communications session with a device, associated with a particular name (e.g., initiate a communications session with "John"). In response to determining the intent of the utterance, the NLU system 260 may communicate the received command to an appropriate subject matter server or skill on the functionalities system 262 to perform one or more tasks, and/or retrieve an appropriate response or response information. The NLU system 260 may include processor(s) 252, storage/memory 254, and communications circuitry 256 which, in one embodiment, may be substantially similar to the processor(s) 202, storage/memory 204, and communications circuitry 206 of the user device 290, and the previous description may apply.

The functionalities system 262 (also referred to as speech-lets module 262) may, for example, correspond to various action specific systems or servers, sometimes referred to as "skills," capable of processing various task specific actions. The functionalities system 262 may further correspond to first party applications and/or third party applications capable of performing various tasks or actions. For example, based on the context of the audio data received from the user device 290, the language processing system 250 may use a certain functionality to generate a response, or to obtain response information, which in turn may be communicated back to the user device 290. For instance, an utterance may ask for weather information, and therefore the functionalities system 262 may access a weather application to obtain current weather information for a location associated with the user device 290. The functionalities system 262 may also include processor(s) 252, storage/memory 254, and communications circuitry 256.

The TTS system 264 may employ various text-to-speech techniques. However, techniques for transcribing text into speech are well known in the art and need not be described in further detail herein, any suitable computer implemented text to speech technique may be used to convert the output text into audio signal(s) into text, such as SOFTSOUND speech processing technologies available from the Autonomy Corporation, which is headquartered in Cambridge, England, United Kingdom. The TTS system 264 may also include processor(s) 252, storage/memory 254, and communications circuitry 256.

The accounts system 268 may store one or more user accounts corresponding to users having a registered account on the computer system 200. For example, a parent may have a registered account on the computer system 200, and each of the parent's children may have their own user account registered under the parent's registered account. The accounts system 268 may also store one or more group accounts corresponding to one or more shared devices. For example, a shared device, such as shared the user device 290, may have its own group account stored on the accounts system 268. The group account may be associated with the shared device, and may also be linked to one or more individual's user accounts. For example, the shared user device 290 may be associated with a first group account corresponding to a first grouping of individual (e.g., a family). One or more user accounts may also be associated with the first group account (e.g., individual members of the family), corresponding to individuals that may be capable of interacting with the shared user device 290. Information, settings, and/or preferences, for example, for each user account may be stored within a user account database. In some embodiments, the accounts system 268 may store a voice signal, such as voice biometric information, for a specific user account. This may allow speaker identification techniques to be used to match a voice-to-voice biometric data associated with a specific user account. In some embodiments, the accounts system 268 may store a telephone number assigned to a particular user account, a device identifier associated with a particular device, a communications identifier associated with a particular user account and/or group account, or any other suitable information, or any combination thereof.

It should also be recognized that although each of the ASR system 258, NLU system 260, subject matter/skills system 262, TTS system 264, and accounts system 268 may each include instances of the processor(s) 252, storage/memory 254, and communications circuitry 256, and those instances of processor(s) 252, storage/memory 254, and communications circuitry 256 within each of the ASR system 258, NLU system 260, functionalities system 262, TTS system 264, and accounts system 268 may differ. For example, the structure, functionality, and style of the processor(s) 252 within ASR system 258 may be substantially similar to the structure, functionality, and style of the processor(s) 252 within NLU system 260, however the actual processor(s) 252 need not be the same entity.

The computer system 200 may also include, in a non-limiting embodiment, a communications system 250, which may be configured to facilitate communications between two or more user devices 290. For example, the communications system 250 may be capable of facilitating a communications session between an imitating user device 290 and at a recipient user device 290. Upon the language processing system 250 determining that an intent of an utterance is for a communications session to be established with another device, the user device 290 may access the communications system 250 to facilitate the communications session between the initiating device and the receiving device. For example, the communications system 250 may employ VoIP functionality to facilitate audio, video, and/or text data communications between the initiating device and the recipient device.

As an illustrative example, a communications session between two devices is described below to illustrate how the communications session may be established. In one example embodiment, an individual (e.g., caller 122) may speak an utterance (e.g., "Alexa, send a message to John: 'Want to have dinner at my place?'") to their user device 290 (e.g., the initiating user device 120). In response to detecting the device's wakeword (e.g., "Alexa"), the user device 290 may begin sending audio data representing the utterance to the computer system 200, and in particular to the language processing system 250. Upon receipt, the ASR system 258 may perform speech recognition processing, such as speech-to-text processing, to the audio data to generate text data representing the audio data. The text data may then be passed to the NLU system 260 to determine the intent of the utterance. For example, the NLU system 260 may include a listing of sample utterances to be used to disambiguate the spoken words and determine an action intended to occur for the utterance. In some embodiments, a messaging speechlet system may be included within the NLU system 260 that includes one or more sample utterance frameworks. If the format of the spoken utterance substantially matches one of these sample utterances, then that may indicate that the intent of the utterance was for a communications session to be initiated. For instance, one sample utterance may be "{Wakeword}, send a message to {Contact Name}: {Message}." If the framework of the spoken utterance's text data substantially matches this sample utterance framework, the NLU system 260 may determine that the intent of the utterance was to start a communications session with a contact of the user, and NLU may also determine that the intended target of the communications session is "John" (e.g., {Contact Name}: John). After determining that a message is to be sent to a contact named "John," the communications system 250 may rely on a contact services system 228 that accesses the accounts system 268 determines whether any device identifiers (e.g., a device address) are associated with the contact, "John." If multiple devices are determined, the communications system 250 may access a preferences system 224 that stores preferences of the contact for using the different devices and a contact presence monitoring system 244 that detects the presence of the contact relative to these devices and provides proximity information. The communications system 250 identifies a particular device or a particular subset of the devices that communications with which the communications can be initiated.

In some embodiments, the communications system 250 may establish a communications session between an initiating device 290 and a recipient device 290 using one or more VoIP protocols including, but not limited to SIP, RTP, RTCP, SRTP, and SDP or other communication protocols implemented by a communications routing service 226. In one illustrative embodiment, a SIP signaling command may be provided to the communications system 250 for communicating with the recipient device. In particular, PJSIP functionality adds a new "user-to-user" header that indicates the device pair for the communications session.

In some embodiments, the communications system 250 may include a communication rules engine 242 that may store various rules for how certain communications between group accounts and user accounts are to behave (including the communications rule that define the communications logic 116, as described in connection with FIG. 1) and that may store device information for different user devices. For example, the communications rules engine 242 may store communications routing information and instructions for how different messages may be sent from one device to another device depending on a variety of parameters including, but not limited to, if the sender device is a shared device, if the recipient device is a shared device, if the sender device is a personal device, if the recipient device is a personal device, if there are any personal and/or shared devices associated with the sender device and/or recipient device, and/or whether or not speaker identification was able to positively identify a speaker. Other parameters relate to the device information, such as device type identifier, software version, and status. In some illustrative embodiments, the communication rules engine 242 may store a communications table indicating various device identifiers, group account identifiers, communication identifiers, and device types for various devices interacting with the communications system.

In some embodiments, the communications system 250 may also include a message data store that may correspond to any suitable type of storage/memory, such as that of the storage/memory 204, 254, that is capable of storing one or more messages sent/received. For example, when an individual sends a message (e.g., "Want to have dinner at my place?") from their shared electronic device to another shared electronic device, that message may be stored by the communications system using the message data store. In some embodiments, the message data store may be structured to store audio data representing audio message, video data representing video messages, image data representing image messages, text data representing text messages, and/or message notification metadata. When an individual utters a request to receive messages received for their user account and/or group account, the communications system 250 may access the message data store to obtain those messages, and may send the appropriate message data (e.g., audio, video, image, text, etc.) to the corresponding requesting device (e.g., personal device, shared device).

In some embodiments, the message data store may store each message with a corresponding communications identifier, group account identifier, user account identifier, and/or device identifier with which that message is directed to. For example, if a first individual sends an audio message to a second individual, audio data representing that audio message may be stored by the message data store with a group account identifier associated with the second individual's corresponding group account, as stored by accounts system 268. This way, when an individual requests to receive messages associated with their group account, the message data store may be accessed to obtain any messages currently stored thereby that are associated with that group account's group account identifier.

The computer system 200 may also include, in some embodiments, a speaker identification system 270 that may correspond to any suitable device/system capable of identifying a particular person's voice from an audio signal. The speaker identification system 270 may determine whether a current voice being used to speak matches known voice biometric data associated with a particular individual's voice. In some embodiments, voice biometric data may be stored within the accounts system 268 for various individuals having a user account stored thereby. For example, the caller 122 may have a user account on the computer system 200 (e.g., stored within the accounts system 268), which may be associated with the initiating device 120. Stored within that user account may be voice biometric data associated with a voice profile for the caller 122. Therefore, when an utterance is detected, and subsequently when audio data representing that utterance is received by the computer system 200, the speaker identification system 270 may determine whether the voice that spoke utterance matches, to at least a predefined confidence level, the stored voice biometric information associated with the caller 122 stored by their user account. If so, then this may indicate that the caller 122 is the likely speaker of the utterance.

The communications rules engine 242 may employ several communications rules for messages sent/received to/from one or more participants. First, a device type of the sending device may be determined. For example, a determination may be made as to whether or not a device identifier associated with the device that the audio data representing the utterance, which include a message to be sent to another individual's device, is associated with a shared device. Next, a determination may be made by the speaker identification system as to whether or not a speaker that spoke the utterance was able to be identified. Using these two parameters, for instance, the communications rules engine 242 may be configured to cause the communications system to facilitate communications between two or more devices.

Figure 3:
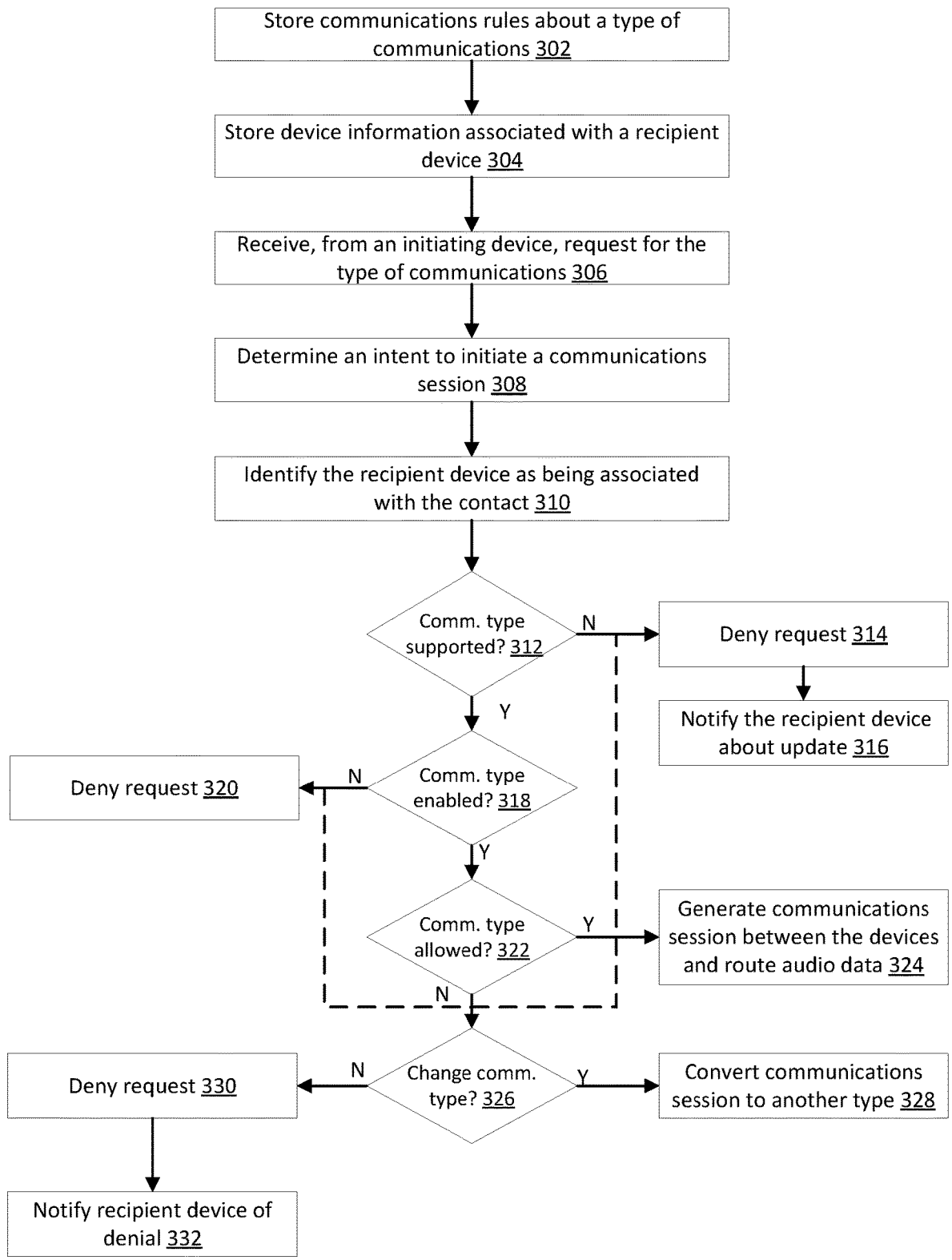
FIG. 3 shows an illustrative flow for managing communications between devices, in accordance with various embodiments.

FIG. 3 shows an illustrative flow for managing communications between devices, in accordance with various embodiments. Some or all of instructions for performing the operations of the illustrative flow can be implemented as hardware circuitry and/or stored as computer-readable instructions on a non-transitory computer-readable medium of a computer system, such as the computer system 110 of FIG. 1 or the computer system 200 of FIG. 2. As implemented, the instructions represent modules that include circuitry or code executable by a processor(s) of the computer system. The use of such instructions configures the computer system to perform the specific operations described herein. Each circuitry or code in combination with the processor represents a means for performing a respective operation(s). While the operations are illustrated in a particular order, it should be understood that no particular order is necessary and that one or more operations may be omitted, skipped, and/or reordered.

The illustrative flow may start at operation 302, where the computer system stores communications rules about a type of communications. In an example, a communications system of the computer system may provide a user interface for defining the rules. The user interface may be presented on a computing device of a vehicle manufacturer, a computing device of a service provider of the computer system, and/or a computing device of a user. Input may be received via the user interface and may define one or more communications tasks that should be performed given device information. In an illustration, the communications rules are defined for Drop Ins, although the communications rules can be similarly defined for other types of communications sessions, including those for synchronous audio communications. In this illustration, the input may indicate that a Drop In should be allowed based on a device type of an intended recipient device (e.g., Drop In allowed if this device is not installed in a vehicle) and/or on a version of a communications application on the intended recipient device (e.g., Drop In allowed if this application is a particular version). Further, the input may indicate that a Drop In should be allowed, denied, or converted based on a status of the intended recipient device at a time of the Drop In and possibly impacting the presentation of the Drop In audio (e.g., the Drop In is allowed if the recipient device is not in motion, converted to a Call if the recipient device is in motion at a speed slower than a speed threshold, and denied if the motion is faster than the speed threshold). In addition, the input may identify a particular recipient device(s) and/or a user account(s) associated with this recipient device. Upon receiving the input, the communications system may generate and store the communications rules and, as applicable associate them with the particular recipient device(s) and/or user account(s).

At operation 304, the computer system may store device information associated with a recipient device. In an example, the recipient device is associated with a user account on the computer system. The communications system may store the device information in storage (e.g. in a data store or in a user account associated with the recipient device) and may associate the device information with an identifier of the recipient device (e.g., its MAC address) and/or the user account. The device information can include a device type identifier, an identifier of a version of the communications application, and an activity context of the recipient device.

At operation 306, the computer system may receive, from an initiating device, a request for the type of communications. The initiating device may be operated by a caller and may be registered under a user account on the computer system. The request may identify a contact associated with the recipient device or the recipient device itself. Referring back to the Drop In illustration, the request may be based on a user utterance (e.g., "Alexa, Drop In on John") and may include an audio package indicating this utterance. In another example, the initiating device may present a GUI to the caller and the caller may select the contact and a Drop In icon from the GUI. In this case, the request may be based on the user selection and may identify the contact and the Drop In request explicitly.

At operation 308, the computer system may determine an intent to initiate a communications session of the type based on the request. In the above illustration of a user utterance, the initiating device may detect the wakeword and prepare and send an audio package of the user utterance to a language processing system of the computer system. In turn, the language processing system may apply ASR processing to the audio data to generate text data and apply NLU processing to the text data to determine the intent of the spoken utterance, which can be provided as intent data as described herein above in connection with FIG. 2. For instance, the NLU processing may determine that the utterance has a format of "{Wakeword}, {Drop In} {Contact Name}," and may identify the elements of utterance based on the determined format, and may determine that the intent of this utterance is for a Drop In to be started with one of the caller's contacts having the contact name. In comparison, in the above example of a user selection via the GUI, the communications system can determine the intent directly from the received request.

At operation 310, the computer system may identify the recipient device as being associated with the contact. In an example, the communications system uses an accounts system, a preferences system, contacts services system, and a contact presence monitoring system to identify the recipient device as described herein above in connection with FIG. 2. For instance, the communications system accesses the user account associated with the initiating device (or the caller), determines a contact list, and matches the contact name (e.g., "John") with a contact from this list. The matched contact may include the identifier of the recipient device (its MAC address) or identifiers of multiple recipient devices associated with the contact. Alternatively, the matched contact may uniquely identify the user account associated with the contact or the recipient device (e.g., based on an email address of the contact). This user account may be looked up to identify the recipient device(s). If multiple recipient devices are associated with the contact, the communications system may access presence information related to these devices (e.g., current use, recent use, use frequency, and/or user preferences) to select the recipient device (e.g., the one currently in use, most recently used, most frequently used, or preferred to be used).

At operation 312, the computer system may determine whether the type of communications is supported by the recipient device. In an example, the communications system may determine the device type from a device type identifier available from the device information and may look up a data store that identifies the supported functionalities per device type. In another example, the communications system may determine the version of communications application on the recipient device, where the version is available from the device information. The communications system may look up the data to determine the functionalities supported by this version. If the device type and/or version supports communications session (e.g., Drop Ins as in the above illustration), the exemplary flow can proceed to operation 318. Otherwise, operations 314 and 316 may be performed (to deny the request and provide relevant notifications) or, additionally or alternatively, operation 326 may be performed (to determine whether the requested type of communications should be changed to a different type).

At operation 314, the computer system may deny the request. In an example, the communications system does not establish the communications session and sends a denial directive to the initiating device. This directive may instruct the initiating device to present TTS, audio, text, and/or multimedia messages informing the caller that the contact is not in proximity of a recipient device that supports the type of the requested communications (e.g., Drop Ins as in the above illustration).

At operation 316, the computer system may notify the recipient device about an update to support the type of communications. In an example, the communications system may send an update directive to the recipient device. This directive may instruct the recipient device to download an updated version of the communications application, where this version may support the type of the communications (e.g., Drop Ins as in the above illustration).

At operation 318, the computer system may determine whether the type of communications is enabled on the recipient device. In an example, even if supported, the type of communications (e.g., Drop Ins as in the above illustration) may not have been enabled for the recipient device. Accordingly, the communications system determines from the user account associated with the recipient device whether the type of communications has been enabled, for instance, as a skill to the recipient device. If so, the exemplary flow can proceed to operation 322. Otherwise, operation 320 may be performed (to deny the request) or, additionally or alternatively, operation 326 may be performed (to determine whether the requested type of communications should be changed to a different type).

At operation 320, the computer system may deny the request. In an example, the communications system does not establish the communications session and sends a denial directive to the initiating device. This directive may instruct the initiating device to present TTS, audio, text, and/or multimedia messages informing the caller that the contact is not in proximity of a recipient device that has the type of communications is not enabled.

At operation 322, the computer system may determine whether the type of communications is allowed on the recipient device. In a first example, upon receiving the device information (e.g., as under operation 304), the computer system identifies the communication rules applicable to the recipient device (e.g., based on the device type identifier, the version identifier, and/or the user account). If the communications rules indicate that the type of communications should be allowed given the device information, the computer system stores an indication about this permission. Otherwise, the computer system stores an indication that the Drop In is prohibited. Accordingly, under operation 322, the computer system may look up the indication to perform the determination whether the type of communications is allowed or not. In a second example, performs this determination in real time by accessing the device information and applying the communications rule in response to the request for the type of communications. In both example, if the type of communications should be allowed, the exemplary flow can proceed to operation 324. Otherwise, operation 326 may be performed.

At operation 324, the computer system may generate the communications session between the initiating device and the recipient device. In an example, the SIP protocol can be used to set up this session. For instance and referring to the above illustration, the communications system may send a Drop In directive to the recipient device to accept the Drop In and a Drop In directive to the initiating device indicating that the Drop In is starting. In addition, the communications system may also receive audio data from the initiating device and send this data to the recipient device, and vice versa, over the communications session.

At operation 326, the computer system may determine whether the type of communications should be changed to another type, such as from a Drop In to a Call. In an example, based on the device information, the communications rules may indicate that the change should occur (e.g., based on the recipient being in motion, where the motion is slower than a speed threshold). An indication about this change may be generated and stored under operation 304 or in real-time in response to the Drop In request. If so, the exemplary flow can proceed to operation 328. Otherwise, operations 330-332 may be performed.

At operation 328, the computer system may change the communications session to the other type. For instance and referring to the above illustration, the communications system may send a Call directive to the recipient device. This directive may inform the recipient device of an incoming Call from the initiating device and/or caller and instruct the recipient device to provide a selectable option of accepting the Call. Similarly, the communications system may send an update Call directive to the initiating device. This directive may inform the initiating device of the conversion and may instruct the initiating device to provide a selectable option of accepting the conversion. In addition, the communications system may also receive audio data from the initiating device and send this data to the recipient device, and vice versa, over the communications session.

At operation 330, the computer system may deny the request. In an example, the communications system does not establish the communications session and sends a denial directive to the initiating device. This directive may instruct the initiating device to present TTS, audio, text, and/or multimedia messages informing the caller that the contact is not in proximity of a recipient device allowed to receive the type of communications (e.g., Drop Ins as in the above illustration).

At operation 332, the computer system may notify the recipient device of the denial. In an example, the communications system may send an update directive to the recipient device, where this directive may instruct the recipient device to present TTS, audio, text, and/or multimedia messages informing the contact that the incoming communications was denied. In another example, this update directive may be sent to the recipient device or an Announcement directive may be sent to the multiple recipient devices associated with the contact upon a detection that the device information changed and that the communications rules would allow the type of communications at this time given the change. In this way, the contact may initiate communications of the type to the caller.

Figure 4:
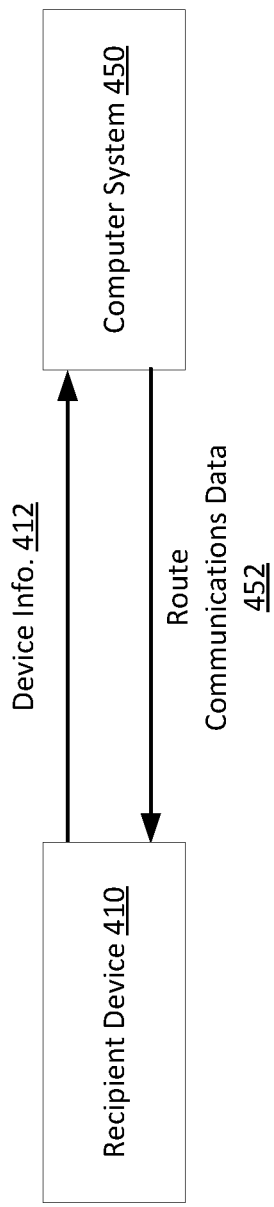
FIG. 4 shows an illustrative communications session with a device for receiving device information, in accordance with various embodiments.

FIG. 4 shows an illustrative communications session with a device for receiving device information, in accordance with various embodiments. As illustrated, a recipient device 410 is in communications with a computer system 450 that includes, for instance, a communications system. The recipient device 410 and the computer system 450 are examples of the recipient device 120 and the computer system 100 of FIG. 1, respectively. The recipient device 410 is online, where a communications session may already exist between the recipient device 410 and the computer system 450. For instance, the recipient device 410 may be on a Call routed through the computer system 450 or may be streaming music from the computer system 450. Based on the communications session with the recipient device 410, the computer system 450 can receive and store device information 412 from the recipient device 410.

Figure 5:
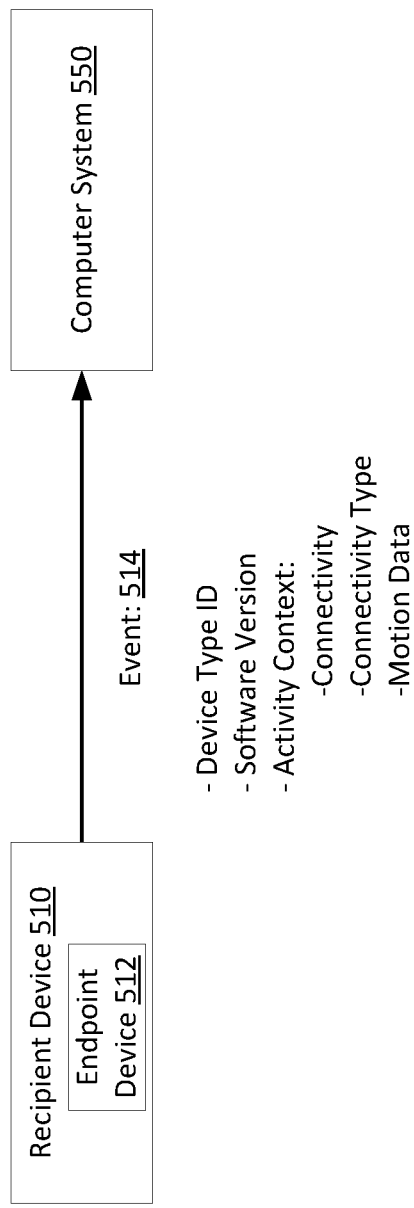
FIG. 5 shows illustrative device information with a recipient device that includes a communications endpoint, in accordance with various embodiments.

FIG. 5 shows illustrative device information with a recipient device 510 that includes a communications endpoint 512, in accordance with various embodiments. As illustrated, the recipient device 510 sends the device information in an event 514 to a computer system 550. In this illustration, the recipient device 510 includes the communications endpoint 512, but no auxiliary device. The device information may relate to the capability of the communications endpoint 512 to exchange and/or present communications. The recipient device 510 and the computer system 550 are examples of the recipient device 120 and the computer system 100 of FIG. 1, respectively.

In an example, the device information sent in the event 514 includes an identifier of a type of the communications endpoint 512 and a software version of a communications application hosted on the communications endpoint 512. The type and software version may be sufficient to determine whether the endpoint device 512 may be in a vehicle and whether specific types of communications (e.g., Drop Ins, Calls, Announcements) are supported. The computer system 550 may store a communications rule that relies on the type and/or software to determine a communications task to be performed in response to a request from an initiating device for communications with the recipient device 510.

In a further example, the communications rule may also rely on an activity context of the communications endpoint 512 to determine the communications task. In this example, the activity context can be included in the device information sent in the event 514 from the recipient device 510. The activity context may indicate the connectivity of the communications endpoint 512 (e.g., whether it is online or offline), the type of the connectivity (e.g., WiFi, a particular generation of mobile phone communications (4G or 5G)), motion data (e.g., in motion or not, motion speed), among other information indicating the capability of the communications endpoint 512 to exchange and present the requested communications.

Figure 6:
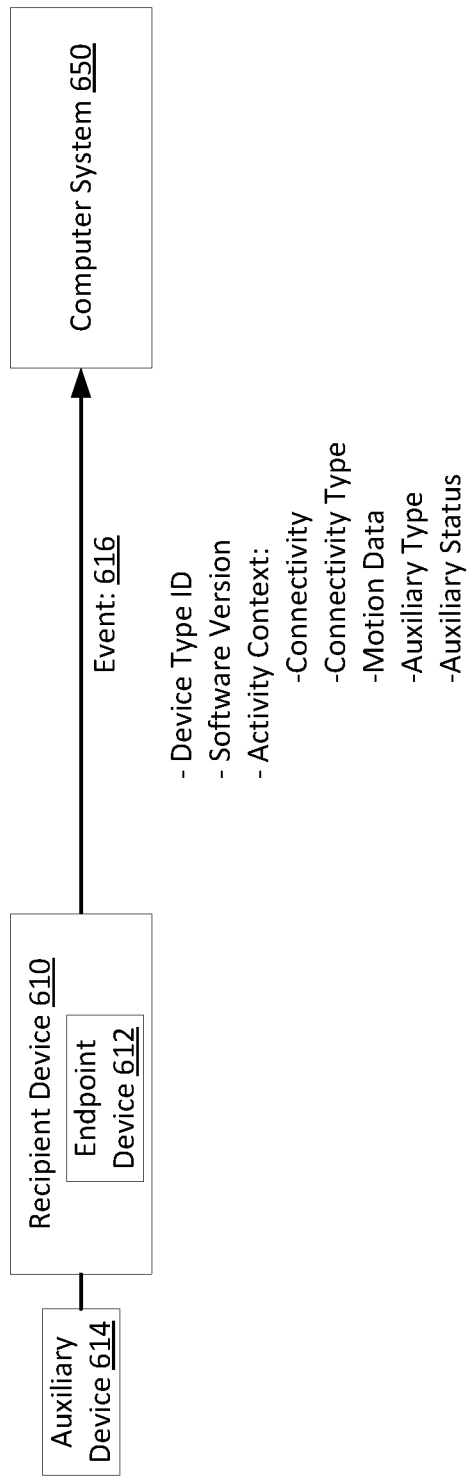
FIG. 6 shows illustrative device information with a recipient device that includes a communications endpoint and an auxiliary device, in accordance with various embodiments.

FIG. 6 shows illustrative device information with a recipient device 610 that includes a communications endpoint 612 and is connected with an auxiliary device 614, in accordance with various embodiments. As illustrated, the recipient device 610 sends the device information in an event 616 to a computer system 650. The information may relate to the capability of the communications endpoint 612 to exchange communications and/or the capability of the auxiliary device 614 to present the communications. The recipient device 610 and the computer system 650 are examples of the recipient device 130 and the computer system 110 of FIG. 1, respectively.

In an example, the device information sent in the event 614 includes an identifier of a type of the communications endpoint 612 and a software version of a communications application hosted on the communications endpoint 612. The type and software version may be sufficient to determine whether the communications endpoint 612 may be in a vehicle and whether specific types of communications (e.g., Drop Ins, Calls, Announcements) are supported. The computer system 650 may store a communications rule that relies on the type and/or software to determine a communications task to be performed in response to a request from an initiating device for communications with the recipient device 610.

In a further example, the communications rule may also rely on an activity context of the recipient device 610 to determine the communications task. In this example, the activity context can be included in the device information sent in the event 616 from the recipient device 610. The activity context may indicate the connectivity of the communications endpoint 612 (e.g., whether the it is online or offline), the type of the connectivity (e.g., WiFi, a particular generation of mobile phone communications (4G or 5G)), motion data (e.g., in motion or not, motion speed), the type of the auxiliary device 614 (e.g., Bluetooth speaker), the connectivity status of the auxiliary device (e.g., paired with over a Bluetooth session), among other information indicating the capability of the communications endpoint 612 to exchange the request communications and/or the capability of the auxiliary device 614 to present the requested communications.

Figure 7:
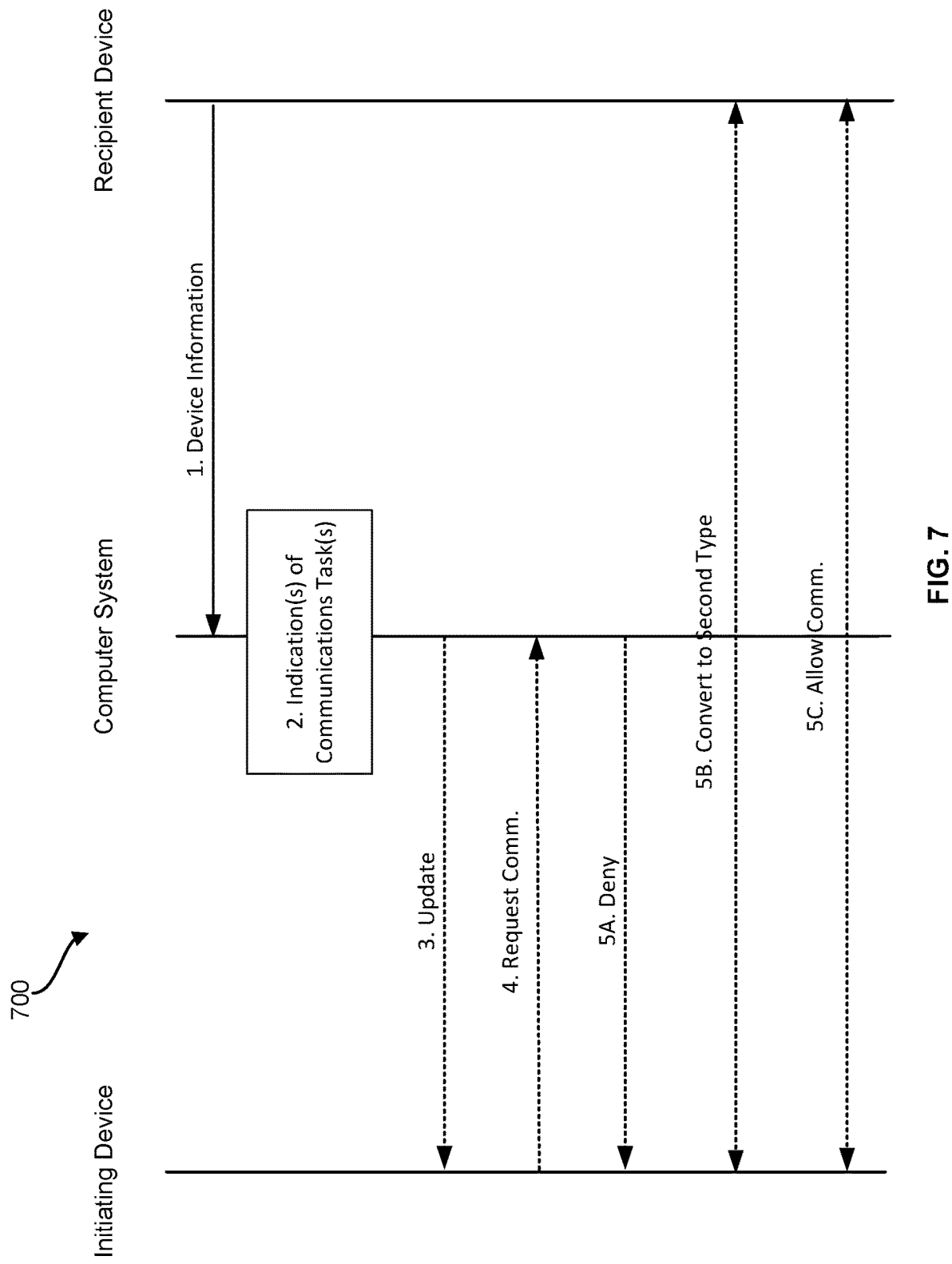
FIG. 7 shows an illustrative sequence diagram to store an indication about whether a communications task is permitted or prohibited, in accordance with various embodiments.

FIG. 7 shows an illustrative sequence diagram 700 to store an indication about whether a communications task is permitted or prohibited, in accordance with various embodiments. In an example, a computer system may store this indication based on device information of a contact's recipient device independently of a request for a particular type of communications from a caller's initiating device. The initiating device, the recipient device, and the computer system are examples of the initiating device 120, the recipient device 130, and the computer system 110 of FIG. 1, respectively.

As illustrated, the computer system receives the device information from the recipient device. The device information includes contextual data about the recipient device such as an identifier of the type of the recipient device, a software version of a communications application of the recipient device or an activity context of the recipient device. This device information can be received based on a communications session with the computer system (e.g., when the recipient device is streaming an audio file from the computer system, where this communications session was established based on a SIP request from the recipient device) or based on a communications session with one or more other user devices, where the computer system may be facilitating this session.

Next, the computer system may store one or more indications of whether the recipient device should support communication task(s) corresponding to communications capabilities. For example, the computer system may access a set of communications rules applicable to the recipient device. This set may define one or more conditions to permit a particular type of communications, prohibit this type, or convert it to another type of communications. In an example the type of communications is Drop Ins, although the communications rules can be similarly defined for other types of communications sessions, including those for synchronous audio communications. Based on the contextual information, the computer system may determine the condition(s) that is (are) satisfied and, accordingly, set an indication of whether the type of communications should be permitted, prohibited, or converted. The computer system may store this indication in a user account associated of the contact.

Optionally, the computer system may update the initiating device based on the indication(s). For example, the contact and/or the recipient device may be identified in a contact list associated with the initiating device. The contact list may be stored in the caller's user account and/or locally on the initiating device. Upon generating the indication about whether the type of communications to the recipient device should be permitted, prohibited, or converted, the computer system may also update the contact list to reflect this indication. In this way, if the indication is that the type of communications is prohibited, the contact list may not provide the caller with an option to request this type of communications.

In addition or alternative to updating the initiating device, the computer system may receive a communications request of a particular type from the initiating device. In response, the computer system may determine whether this type is permitted, prohibited, or should be converted to a second type based on the stored indication(s). For instance, the request is for a Drop In. If the stored indication(s) prohibits Drop Ins, the computer system denies the request by initiating denial communications tasks. These tasks may include sending a directive informing the initiating device about the denial and instructing it to update its user interface to indicate this denial. If the stored indication(s) is for conversion, the computer system converts the request by initiating conversion communications tasks. These tasks may include sending a directive to instruct the initiating device to update its user its user interface to indicate the Call and, optionally, receive user input allowing the conversion and directives to instruct the initiating device and recipient device to establish the communications session and update the user interfaces to indicate the Call. The communications tasks may also include routing audio data once the communications session is established. If the stored indication(s) permits the Drop In, the computer system allows the Drop In from the initiating device to the recipient device. Here, the directives may instruct the initiating device and recipient device to establish the communications session by using VoIP protocols and update the user interfaces to indicate the Drop In.

Over time, the device information may change. Accordingly, the computer system may receive updated contextual data and, in response, may update the stored indication(s). For instance, a stored indication prohibits Drop Ins because a condition for such prohibition is satisfied based on the previously received contextual data. If the updated contextual data indicates that this condition is no longer satisfied (e.g., a condition to permit the Drop Ins is now satisfied), the computer system updates the stored indication to indicate the change to the available capability of the recipient device. To illustrate, if the contextual data indicates that the recipient device is no longer in a vehicle, the indication may be updated from prohibiting to permitting Drop Ins. If the contextual data indicates that the recipient device is no longer in a high speed motion (e.g., is at a speed lower than a speed threshold), the indication may be updated from prohibiting Drop Ins to converting to Calls. If a further update indicates that the recipient device is no longer in motion, the indication may be updated from converting Drop Ins to permitting the Drop Ins. If the contextual data indicates that the recipient device is no longer connected to a cellular network and became connected to a WiFi network and/or a home network, the indication may be updated from prohibiting Drop Ins to converting to Calls.

Figure 8:
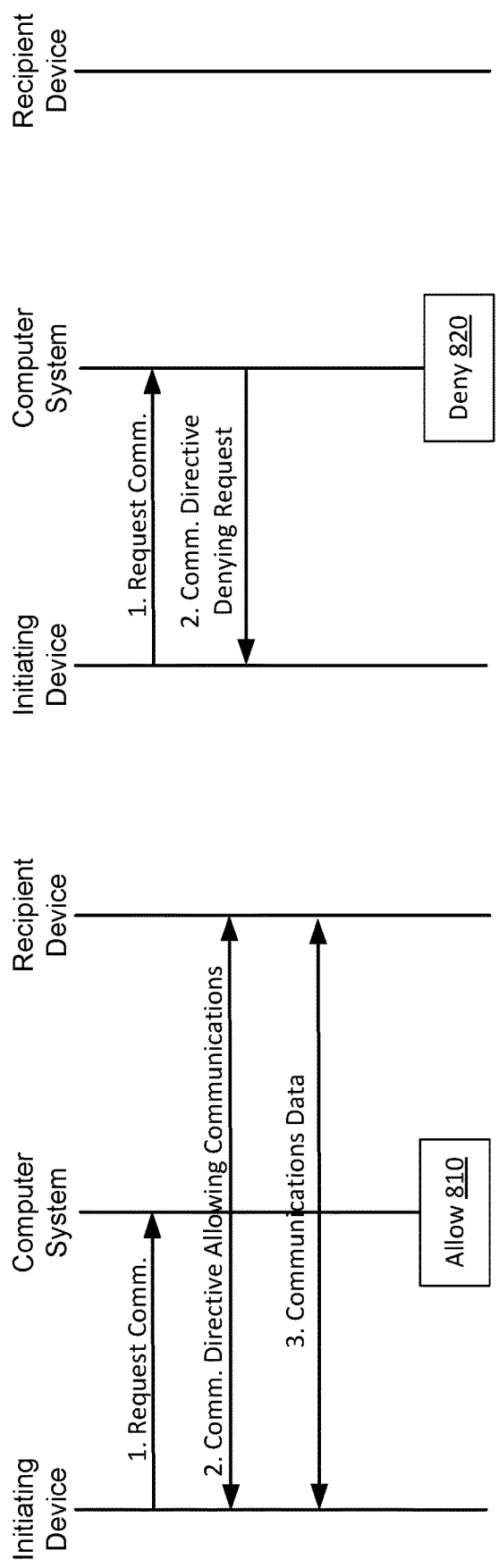
FIG. 8 shows illustrative communications tasks, in accordance with various embodiments.
Figure 8:
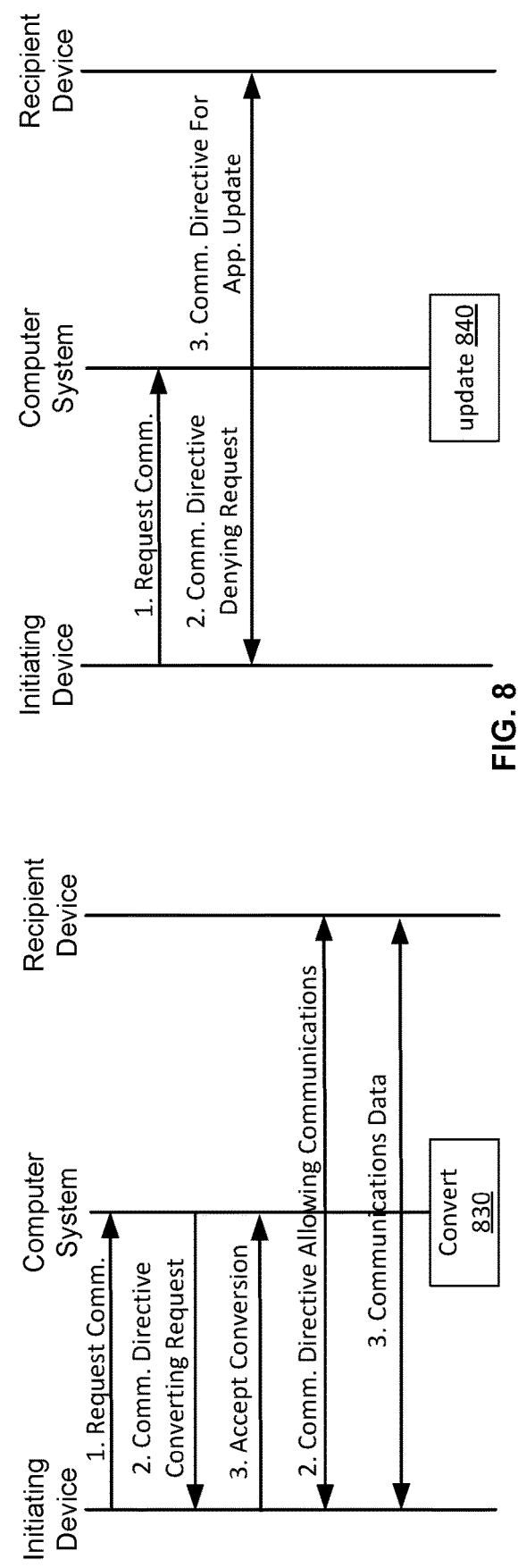

FIG. 8 shows illustrative communications tasks, in accordance with various embodiments. As illustrated, the communications tasks include allowing 810 communications, denying 820 communications, converting 830 communications, and updating 840 communications applications and may be performed based on a communications request. In particular, an initiating device sends the communications request to a computer system for a particular type of communications (e.g., Drop In, Call, Announcement, or the like) with a recipient device. In response, the computer system may apply in real-time communication logic to device information of the recipient device to determine and initiate one or more of the communications tasks 810-940. A communications task can be initiated as a directive that includes a set of commands and/or data that allow the initiating device and the recipient device to perform specific operations including establishing a communications session, exchanging data, updating user interfaces, and/or updating a software version. The initiating device, the recipient device, and the computer system are examples of the initiating device 120, the recipient device 130, and the computer system 110 of FIG. 1, respectively.

In an example of allowing 810 the communications, an initiating device sends a request to the computer system for a Drop In (or any other type of communications) to a recipient device. Upon determining that the Drop In (or the requested type of communications) should be allowed, the computer system sends, to the two devices, communications directives allowing the Drop In (or the requested type of communications). These directives may instruct the initiating device and recipient device to establish the communications session by using VoIP protocols and update the user interfaces to indicate the Drop In. The computer system may also route the communications data between the two devices.

In an example of denying 820 the communications, an initiating device sends a request to the computer system for a Drop In (or any other type of communications) to a recipient device. Upon determining that the Drop In (or the requested type of communications) should be denied, the computer system sends, to the initiating device, a communications directive denying the Drop In (or the requested type of communications). This directive may inform the initiating device about the denial and instruct it to update its user interface to indicate this denial.

In an example of converting 830 the communications, an initiating device sends a request to the computer system for a Drop In (or any other type of communications) to a recipient device. Upon determining that the Drop In (or the requested type of communications) should be converted to another type of communications (e.g., to a Call), the computer system sends, to the initiating device, a communications directive about the conversion. This directive may instruct the initiating device to update its user its user interface to indicate the Call and, optionally, receive user input allowing the conversion. Based on the user input, the initiating device sends an acceptance of the conversion to the computer system. In response, the computer system sends, to the two devices, communications directives allowing the converted type of communications (e.g., the Call). These directives may instruct the initiating device and recipient device to establish the communications session and update the user interfaces to indicate the Call. The computer system may also route the communications data between the two devices.

In an example of updating 840 a communications application, an initiating device sends a request to the computer system for a Drop In (or any other type of communications) to a recipient device. Upon determining that the Drop In (or the requested type of communications) should be denied, the computer system sends, to the initiating device, a communications directive denying the Drop In (or the requested type of communications). This directive may inform the initiating device about the denial and instruct it to update its user interface to indicate this denial. The computer system also sends a directive to the recipient device instructing it to update its software version of the communications application to another version that supports the requested communications type.

Figure 9:
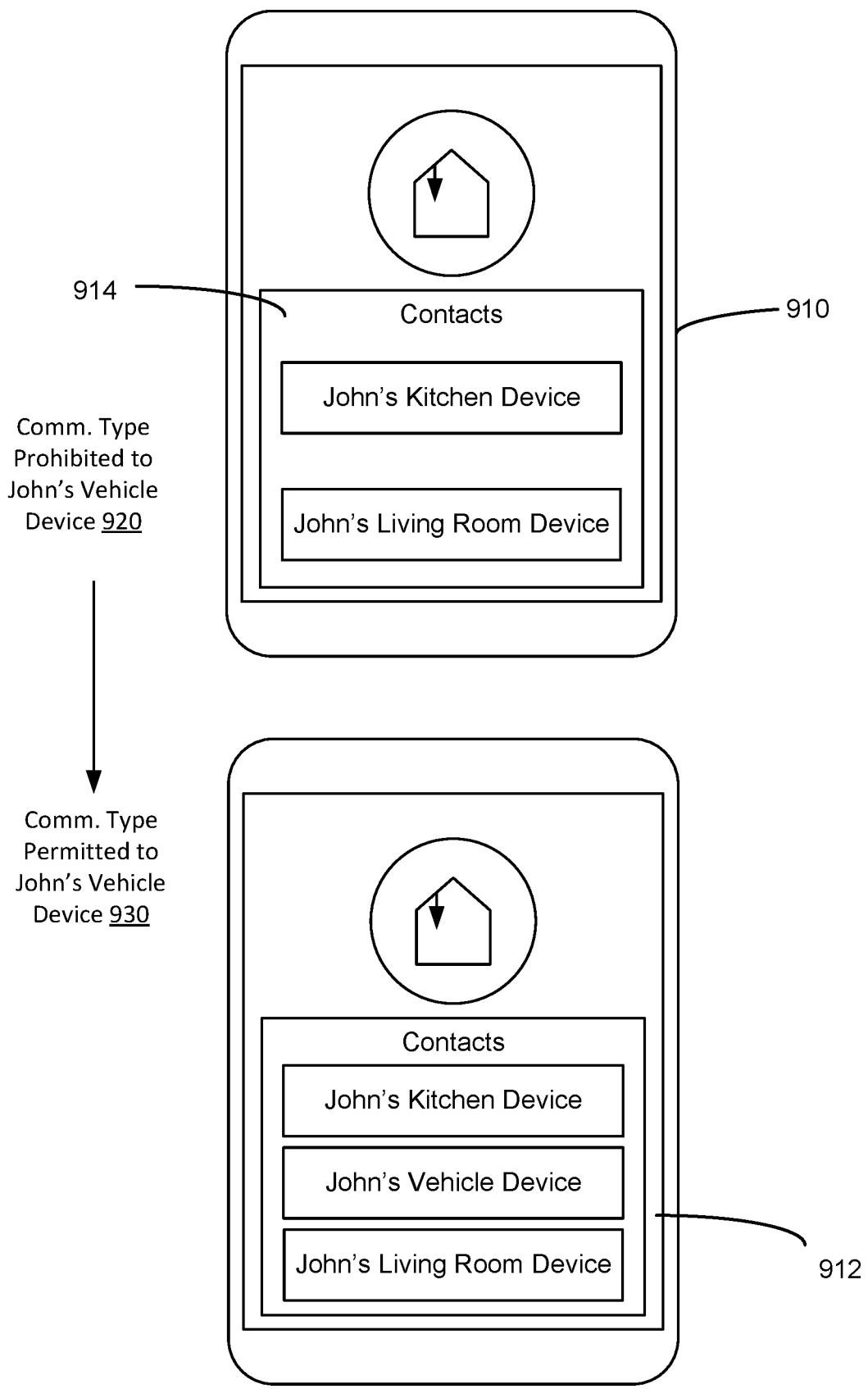
FIG. 9 shows an illustrative user interface associated with a change to a permitted communications capability, in accordance with various embodiment.

FIG. 9 shows an illustrative user interface associated with a change to a permitted communications capability, in accordance with various embodiment. In an example, the user interface is presented by an initiating device 910 and is updated based on a change to a stored indication about the permitted communications capability (e.g., Drop Ins). The initiating device 910 is an example of the initiating device 120 of FIG. 1.

As illustrated, the initiating device 910 presents a GUI 912 to a caller. This GUI 912 is operable to access an option request a type of communications (e.g., Drop Ins). When accessed, the GUI 912 may show a contact list 914 identifying devices for which the type of communications is permitted. As illustrated, this list shows available devices for a contact ("John"). This contact has three devices ("Kitchen Device," "Living Room Device," and "Vehicle Device."). However, at this point in time, Drop Ins to the third device ("Vehicle Device") is prohibited 920. Accordingly, the contact list shows only the two devices but not the third one. The caller can select any of the two devices and request the type of communications with the selected device (e.g., a Drop In on the selected device).

Other ways to show that the third device is unavailable for the type of communications are possible. For instance, rather than removing the third device from the contact list 914, this device may be grayed out (or highlighted with a different color) and may not be selectable.

Subsequently, the type of communications with the third device is permitted 930. Accordingly, when the caller accesses the contact list 914, the GUI 912 also shows the third device as available for the type of communications. In this way, the caller can select any of the three devices and request the type of communications with the selected device (e.g., a Drop In on the selected device).

Figure 10:
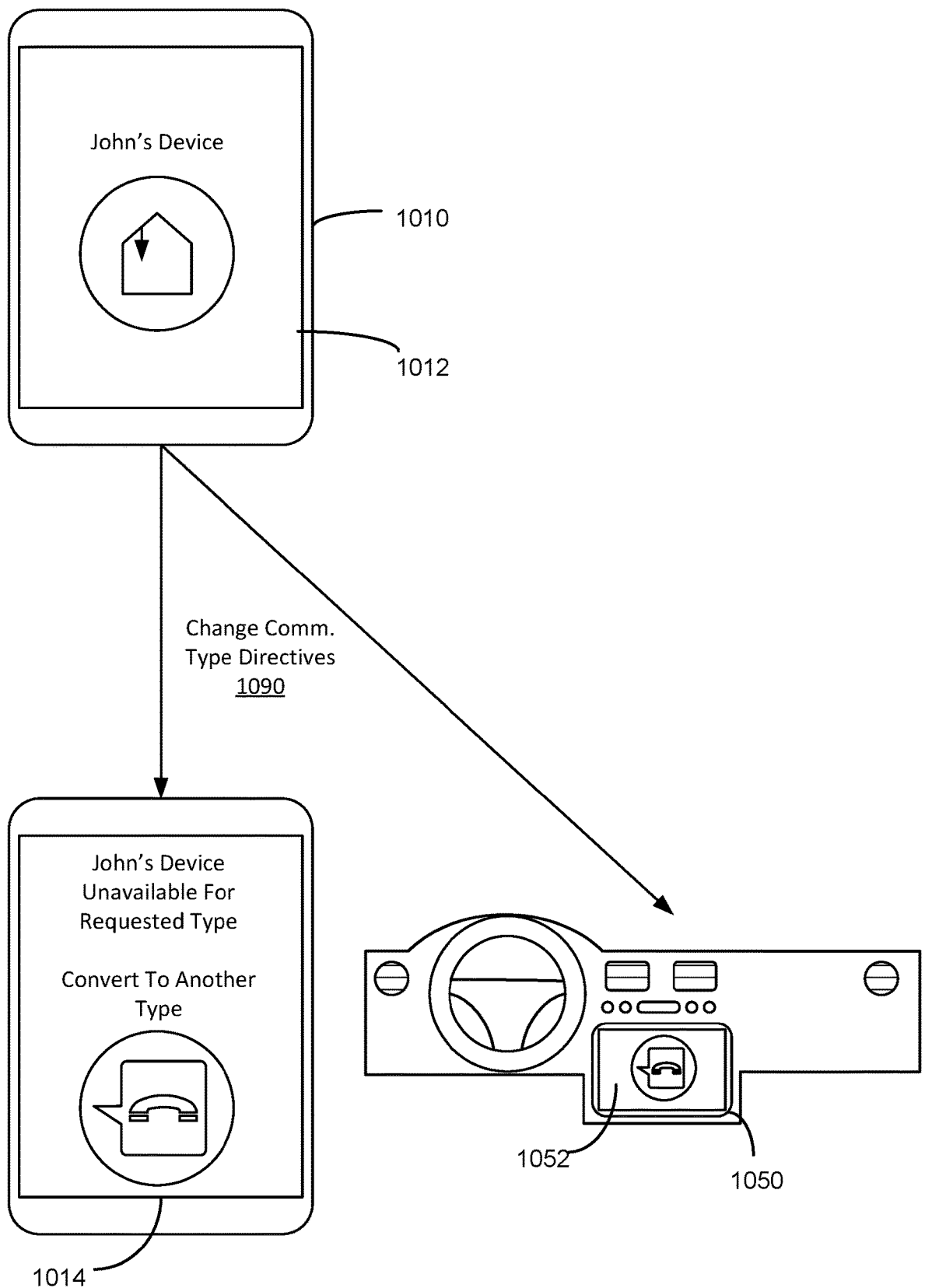
FIG. 10 shows illustrative user interfaces associated with a change to a communications type, in accordance with various embodiment.

FIG. 10 shows illustrative user interfaces associated with a change to a communications type, in accordance with various embodiments. In an example, the user interfaces are presented by an initiating device 1010 and a recipient device 1050, and are updated based on directives from a computer system. The directives may be associated with a communications task to change the communications from a first type to a second type (e.g., from a Drop In to a Call). The initiating device 1010 and the recipient device 1050 are examples of the initiating device 120 and the recipient device 130 of FIG. 1, respectively.

As illustrated, the initiating device 1010 presents a GUI 1012 to a caller. This GUI 1012 indicates that the caller has requested a first type of communications with a contact (e.g., a Drop In to John). Upon a determination that the communications should be changed to a second type (e.g., to a Call), the computer system may send conversion directives 1090 to the initiating device 1010 and the recipient device 1050. In response, the initiating device 1010 updates its GUI (shown as updated GUI 1014) to inform the caller that the second type of communications will be used instead. In an example, the updated GUI 1014 provides an option to the caller to accept the conversion (e.g., to place the Call instead of the Drop In). The recipient device 1050 may also update its GUI 1052 (shown as a user interface on a display unit of a vehicle infotainment system) to inform the contact of an incoming Call.

Other types of user interfaces are possible and updates thereto can depend on the type of these interfaces. For example, lights may be powered on or off, different light colors and/or patterns may be used, audio messages may be played, and the like to inform the caller of the change and the contact of the incoming communications.

Figure 11:
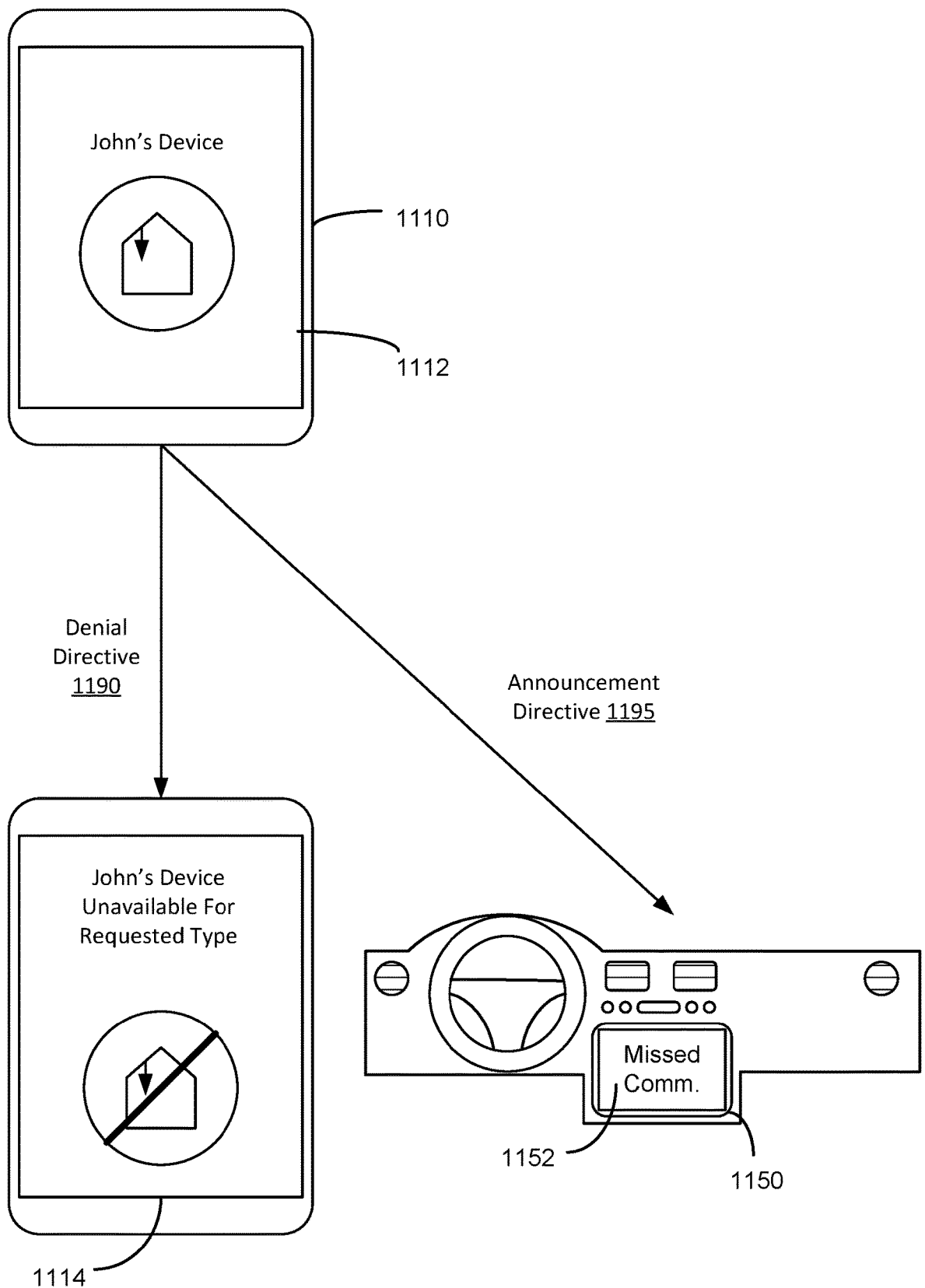
FIG. 11 shows illustrative user interfaces associated with a communications denial, in accordance with various embodiments.

FIG. 11 shows illustrative user interfaces associated with a communications denial, in accordance with various embodiments. In an example, the user interfaces are presented by an initiating device 1110 and a recipient device 1150, and are updated based on directives from a computer system. The directives may be associated with a communications task to deny communications requested by the initiating device 1110 (e.g., a Drop In the recipient device 1150). The initiating device 1110 and the recipient device 1150 are examples of the initiating device 120 and the recipient device 130 of FIG. 1, respectively.

As illustrated, the initiating device 1110 presents a GUI 1112 to a caller. This GUI 1112 indicates that the caller has requested a particular type of communications with a contact (e.g., a Drop In to John). Upon a determination that the communications should be denied, the computer system may send a denial directive 1190 to the initiating device 1110. In response, the initiating device 1110 updates its GUI (shown as updated GUI 1114) to inform the caller of the denial.

In an example, the computer system may also send an Announcement directive 1195 to the recipient device 1150. This directive 1195 may instruct the recipient device to present an Announcement about the requested communications that was denied. The instructions may restrict the presentation of the Announcement until a change to the activity context of the recipient device 1150 indicating that the presentation is allowable (e.g., upon the vehicle becoming stationary). Once the change is detected, the recipient device 950 may update its GUI 1152 (shown as a user interface on a display unit of a vehicle infotainment system) to inform the contact of denied communications from the caller.

Other types of user interfaces are possible and updates thereto can depend on the type of these interfaces. For example, lights may be powered on or off, different light colors and/or patterns may be used, audio messages may be played, and the like to inform the caller of the change and the contact of the incoming communications.

FIGS. 12-16 show illustrative flows for managing communications between devices, in accordance with various embodiments. Some or all of instructions for performing the operations of the illustrative flow can be implemented as hardware circuitry and/or stored as computer-readable instructions on a non-transitory computer-readable medium of a computer system, such as the computer system 100 of FIG. 1. As implemented, the instructions represent modules that include circuitry or code executable by a processor(s) of the computer system. The use of such instructions configures the computer system to perform the specific operations described herein. Each circuitry or code in combination with the processor represents a means for performing a respective operation(s). While the operations are illustrated in a particular order, it should be understood that no particular order is necessary and that one or more operations may be omitted, skipped, and/or reordered.

In the interest of clarity of explanation, the examples flows are described in connection with an initiating device requesting a particular type of communications (e.g., a Drop In) with a recipient device. The initiating and recipient devices are examples of a first device of a caller and a second device of a contact exchanging communications based on a communications system of the computer system.

Figure 12:
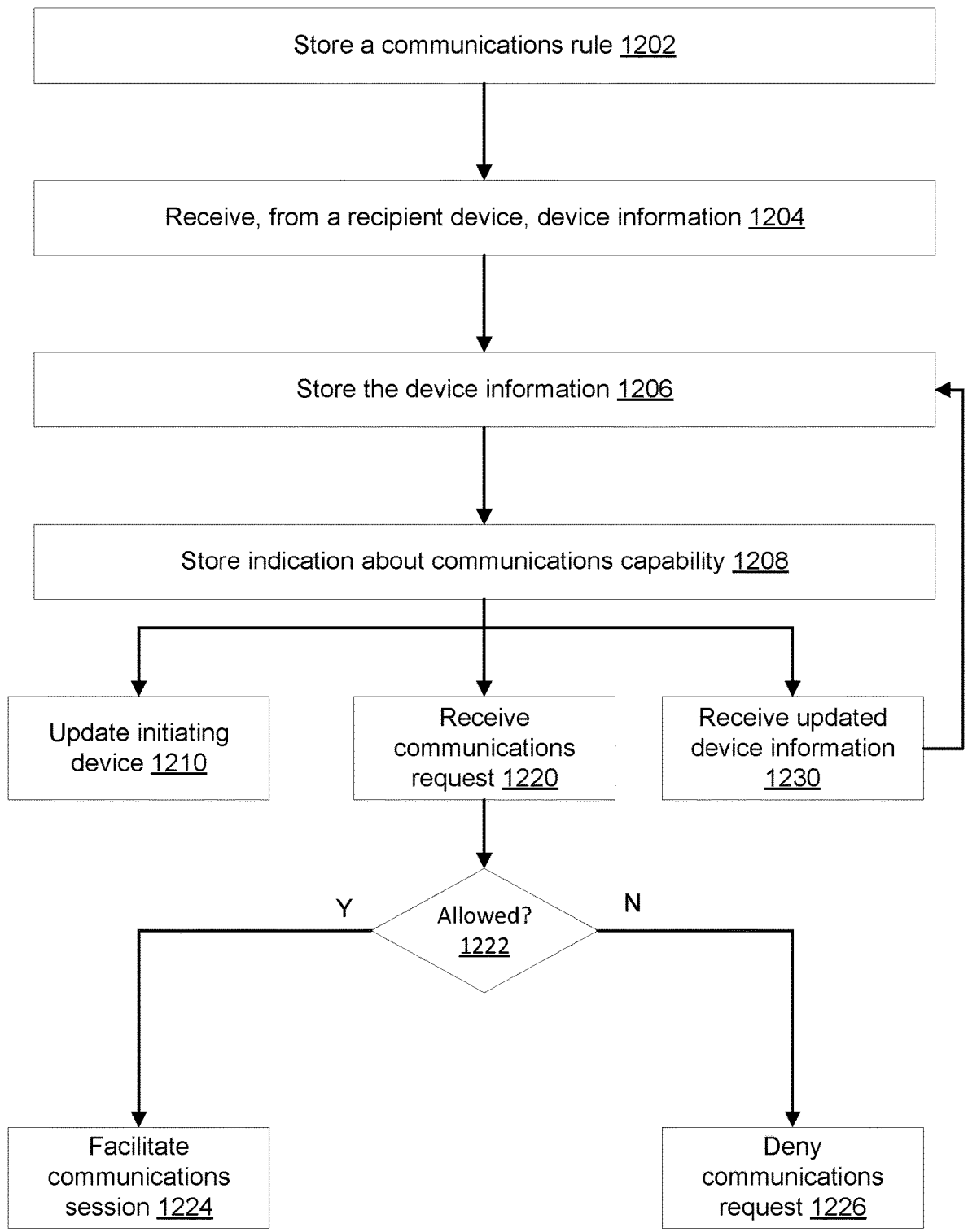
FIG. 12 shows an illustrative flow for indicating whether a recipient device should support a type of communications capability, in accordance with various embodiments.

FIG. 12 shows an illustrative flow for indicating whether a recipient device should support a type of communications session, in accordance with various embodiments. The illustrative flow may start at operation 1202, where the computer system may store a communications rule. In an example, the communications rule specify one or more conditions to permit or prohibit a type of communications (e.g., Drop Ins) or change the communications to a different type (e.g., convert Drop Ins to Calls).

At operation 1204, the computer system may receive, from the recipient device, device information. In an example, the recipient device is associated with a user account. The user account may include permission data to automatically establish audio communications sessions by one or more user devices associated with the user account. For instance, the computer system may have stored the permission data based on an explicit request from a contact of the user account or based on an implicit determination based on previous communications between user devices of the contact and the caller. The permission data can be stored as a Boolean data type, where "true" indicates that the one or more user devices are permitted to establish the type of communications session (e.g., an automatically established audio communications session without a user action to accept the audio communications session). A "false" value indicates that the one or more user devices are prohibited from establishing this type of communications session.

At operation 1206, the computer system may store device information from the recipient device. In an example, the computer system may have previously established a communications session with the recipient device (synchronous, asynchronous, automatic, and/or based on a user action manually accepting this session) based on the recipient device executing a SIP protocol and sending a SIP request to the computer system for the pervious communications session. The device information includes contextual data indicating, for example, a type of the recipient device, a software version of a communications application of the recipient device, and/or an activity context of the recipient device.

At operation 1208, the computer system may store an indication about a communications capability of the recipient device based on the device information, the permission data, and the communications rule. In an example, the computer system determines if the permission data for the type of communications session exists (e.g., has the contact provided a permission for Drop Ins). If not, the type of communications session (e.g., Drop Ins) is prohibited. If so, the computer system determines whether the contextual data satisfies the one or more conditions specified by the communications rule to permit, prohibit, or modify the type of communications session. Accordingly, if the Drop Ins should be prohibited, the computer system stores, in the caller's user account for instance, an indication that the Drop Ins are prohibited. If the Drop Ins should be converted to a different type of communications session (e.g., to Calls), the computer system stores, in the caller's user account for instance, an indication about the conversion. If the Drop Ins should be permitted, the computer system optionally stores, in the caller's user account for instance, an indication about this permission.

At operation 1210, the computer system may update the initiating device based on the indication about the communications capability. In an example, the caller's contact list is updated to reflect the indication. For instance, if the Drop Ins are to be prohibited, the recipient device may be removed from the caller's contact list for Drop Ins but may still be shown on the caller's contact list for Calls. If the Drop Ins were prohibited and became permitted, the recipient device may be added to the caller's contact list for Drop Ins.

At operation 1220, the computer system may receive a communications request from the initiating device. In an example, this operation may be performed alternatively to or independently of operation 1210. In other words, the caller may request a particular type of communications session to the initiating device (e.g., a Drop In) even when the corresponding communications capability is not available to the initiating device.

At operation 1222, the computer system may determine whether the communications request should be allowed. In an example, the computer system determines the type of the requested communications and compares this type to the stored indication about the available communications capability. If the comparison indicates a match, the request may be allowed and operation 1224 may follow operation 1222. Otherwise, the request may be denied and operation 1226 may follow operation 1222. For instance, if the request was for a Drop In and the indication permits or converts Drop Ins, the computer system may determine that the request is allowable (and in the case of conversion, the request can be automatically converted to a Call or converted to a Call pending confirmation of the caller). However, if the indication prohibits Drop Ins, the computer system may determine that the request should be denied.

At operation 1224, the computer system may facilitate the communications session between the initiating device and the recipient device. In an example, the Drop In request is allowed as is. Accordingly, the computer system sends a directive to the recipient device to automatically establish the communications session. In another example, the Drop In request is converted. Accordingly, the computer system sends a directive to the recipient device to establish the communications session upon a user action of the caller at the recipient device manually accepting the Call.

At operation 1226, the computer system may deny the communications request. In an example, the computer system may respond back to the initiating device indicating that no communications session to the recipient device can be established.

At operation 1230, the computer system may receive updated device information from the recipient device. For example, the contextual data of the recipient device may change over time. The computer system may receive the changes and loop back to operation 1206 to store these changes and subsequently update the indication about the available communications capability.

Although the example flow of FIG. 12 is illustrated in connection with a single recipient device of the contact, this example flow similarly applies to multiple recipient devices of the contact. In particular, the computer system may receive and store device information from each of such recipient devices, generate and store indication about their available communications capabilities, and manage updates to and/or communications request from the initiating device accordingly.

Figure 13:
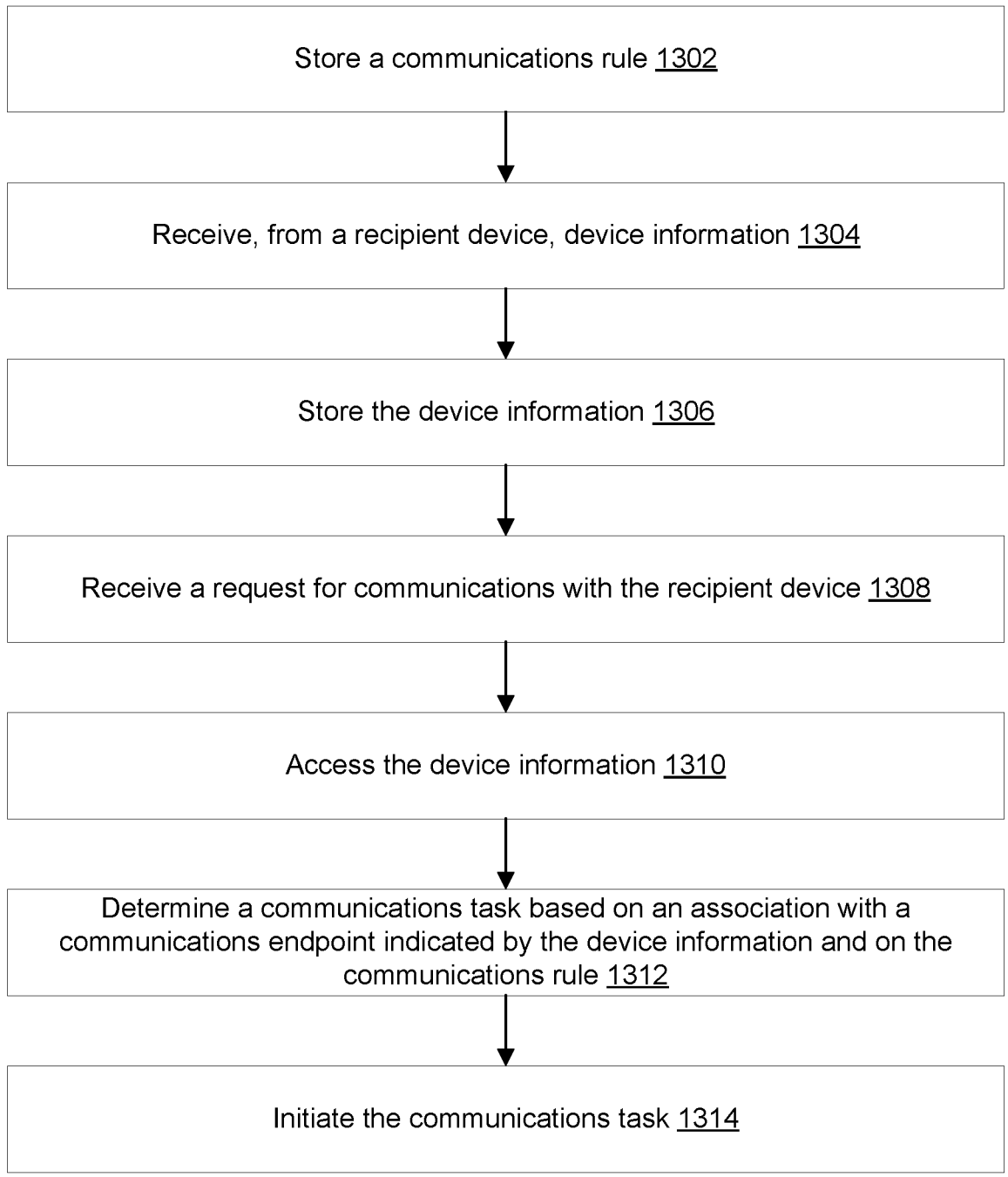
FIG. 13 shows an illustrative flow for managing communications between devices based on device information and a communications rule, in accordance with various embodiments.

FIG. 13 shows an illustrative flow for managing communications between devices based on device information and a communications rule, in accordance with various embodiments. The illustrative flow may start at operation 1302, where the computer system may store a communications rule about communicating with communication endpoints. In an example, the communications rule can be stored as part of a communications logic to manage communications to and from communication endpoints in a vehicle. The computer system may provide a user interface to a vehicle manufacturer, a service provider of the computer system, or an operator of the recipient device to define the communications rule.

At operation 1304, the computer system may receive, from the recipient device, device information. In an example, the device information may indicate an association between the recipient device and a communications endpoint in a vehicle. For instance, the association may indicate that the recipient device is integrated or interfaces with a vehicular system. In particular, the device information may identify a type of the recipient device, a software version of a communications application on the recipient device, and an activity context of the recipient device. The type and/or the software version may indicate whether the recipient device is integrated with the vehicular system or not. The activity context may indicate whether the recipient device is an endpoint device in the vehicle and/or interfaces with such an endpoint and/or an auxiliary device of the vehicular system. The device information may be received in an event from the recipient device.

At operation 1306, the computer system may store the device information in a data store. As illustrated herein above in connection with FIG. 12, the computer system may also generate and store an indication about the available communications capability of the recipient device based on the communication rule and the device information. At operation 1308, the computer system may receive a request for communications with the recipient device. In an example, the request is received from the initiating device and indicates a user intent for a particular type of the communications (e.g., a Drop In). The user intent may be explicit in the request or may be determined by a language processing system of the computer system.

At operation 1310, the computer system may access the device information. In an example, the computer system may look up the data store based on an identifier of the recipient device or a user account associated with the recipient device. As described herein above in connection with FIGS. 1-3, the computer system may determine a contact from the request and identify the recipient device or user account based on the contact and other information (e.g., presence information).

At operation 1312, the computer system may determine a communications task based on the association with the communications endpoint indicated by the device information and on the communications rule. In an example, based on the association (e.g., the recipient device is in a vehicle), the computer system may access the set of communications rules applicable to that type of association (e.g., the rules applicable to managing the communications to vehicles). In another example, the communications rule may have been defined for a type of a device and/or a software version of a communications application. In this example, the computer system may match the device information with the defined type and/or software version to retrieve the communications rule. In yet another example, the communications rule may have been defined particularly for the recipient device and/or the user account associated with the recipient device. In this example, the computer system may retrieve the communications rule based on the recipient device's identifier and/or the user account.

Depending on the communications rule, the type of the recipient device and/or the software version may be sufficient to determine the communications task in response to the requested communications task. For instance, the type and/or software version indicate an integration or interface with the vehicular system and the request communications is for a Drop In. In this illustration, the communications rule may deny all Drop Ins to the vehicle. Accordingly, the computer system may determine a denial communications task.

In another illustration, the activity context of the recipient device may also be used. For instance, the type and/or software version may be used to determine that the recipient device supports the requested communications type (and, otherwise, to initiate an update communications to update the software version to provide the support). The user account associated with the recipient device may indicate that the skill for the communications type is enabled. In comparison, the activity context may be used for the determination as to whether to allow the communications, deny it, or change it to a different type. To illustrate, the communications rule may specify that the particular communications type (e.g., Drop In) should be allowed if the speed indicated by the activity context is less than a first threshold (e.g., is close to zero), changed to the different communications type (e.g., a Call) if the speed is between the first threshold and a second threshold, and denied if the speed is greater than the second threshold. In another illustration, the communications rule may specify that the particular communications type is allowed if the recipient device is interfacing with an active auxiliary device (e.g., paired with a Bluetooth speaker) and, otherwise, denied. Based on the activity context, the computer system may determine the proper communications task specified by the communications rule. As illustrated herein above in connection with FIG. 12, the computer system may also or alternatively rely on the stored indication about the available communications capability of the recipient device to determine the communications task.

At operation 1314, the computer system may initiate the communications task. In an example, the relevant directive(s) is sent to the initiating device and/or recipient device. The computer system may also establish a communications session and route communications data as needed by the communications task.

Figure 14:
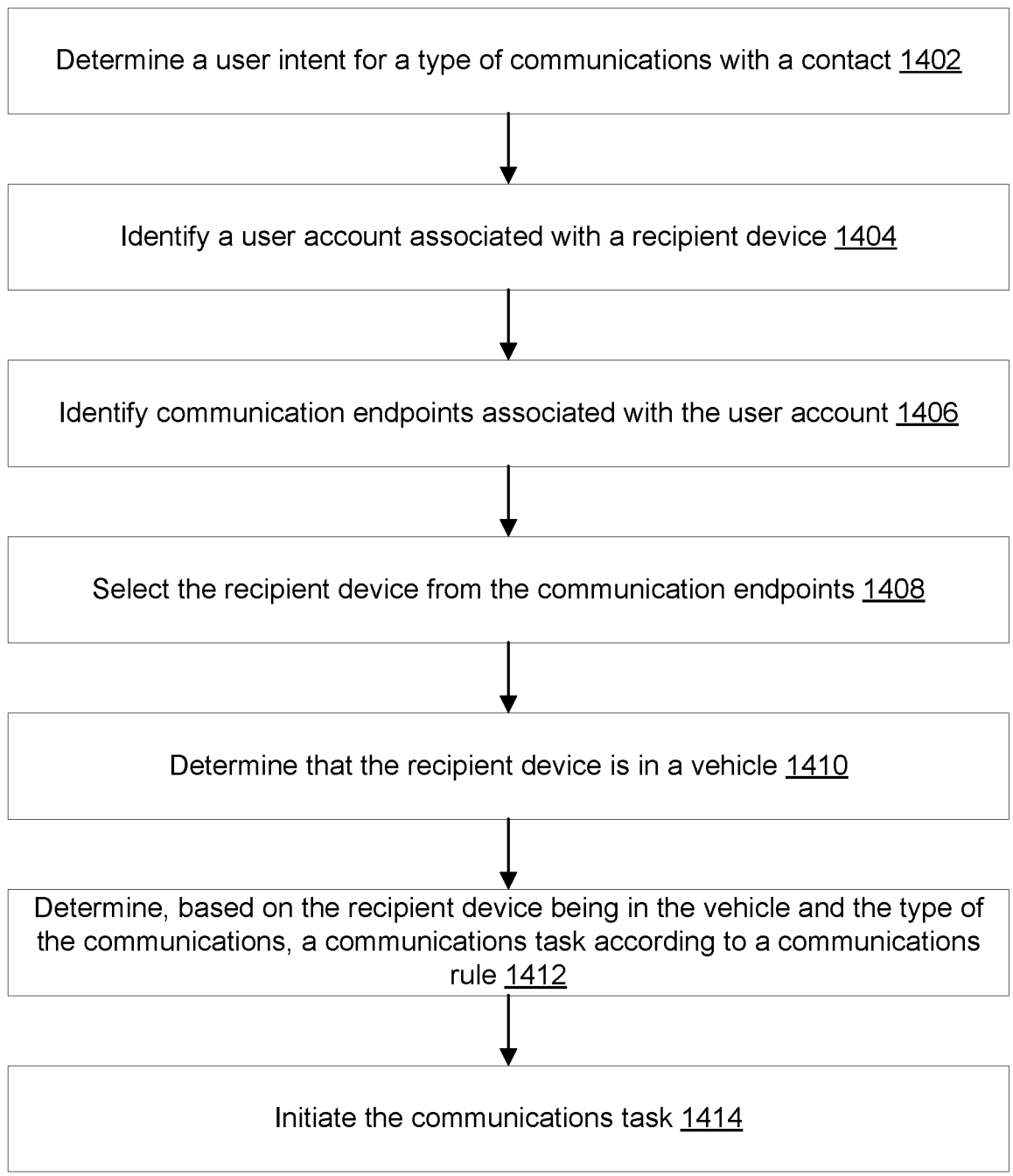
FIG. 14 shows an illustrative flow for managing communications with a device in a vehicle, in accordance with various embodiments.

FIG. 14 shows an illustrative flow for managing communications with a device in a vehicle, in accordance with various embodiments. In an example, the illustrative flow may be performed in response to a Drop In request, where the contact is determined to be in proximity of a recipient device in a vehicle, and the requested Drop In may be allowed, changed to a Call, or denied. Operations of the illustrative flow of FIG. 14 can be implemented as sub-operations of certain operations of the illustrative flow of FIG. 13.

The illustrative flow may start at operation 1402, where the computer system may determine a user intent for a type of communications with the contact. In an example, the computer system may receive a request for the communications from an initiating device. The request may explicitly identify the type of the communications and the contact. Alternatively, such as in the case of a user utterance, the request may include data about the user utterance. The language processing system of the computer system may determine the type of the communications and the contact from the user utterance.

At operation 1404, the computer system may determine a user account associated with the recipient device (e.g., the contact's user account). For example, the initiating device may be associated with a user account (e.g., the caller's user account) that includes a contact list containing the contact and its association with the contact's user account.

At operation 1406, the computer system may identify communication endpoints associated with the determined user account (e.g., the contact's user account). In an example, the computer system may access the contact's user account listing identifiers of different communication endpoints associated with the contact.

At operation 1408, the computer system may select the recipient device from the communication endpoints. In an example, this selection may be performed based on presence information of the contact. In particular, if the presence information indicates that the contact is most likely in proximity of the recipient device rather than the other contact's communication endpoints, this device is selected.

At operation 1410, the computer system may determine that the recipient device is in a vehicle. In an example, the computer system accesses the device information of the recipient device. The type of the recipient device and/or its software version may indicate that it is in the vehicle. Additionally or alternatively, this indication can be based on the recipient device's activity context. Being in the vehicle may correspond to the recipient device being integrated or interfacing with a vehicular system of the vehicle.

At operation 1412, the computer system may determine, based on the recipient device being in the vehicle and the type of the communications, a communications task according to a communications rule. Similarly to operation 1312 of FIG. 13, here the computer system may retrieve the applicable communications rule and determine whether the requested communications task should be allowed, converted, or denied based on the device information. As illustrated herein above in connection with FIG. 12, the computer system may also or alternatively rely on the stored indication about the available communications capability of the recipient device to determine the communications task. At operation 1414, the computer system may initiate the communications task.

Figure 15:
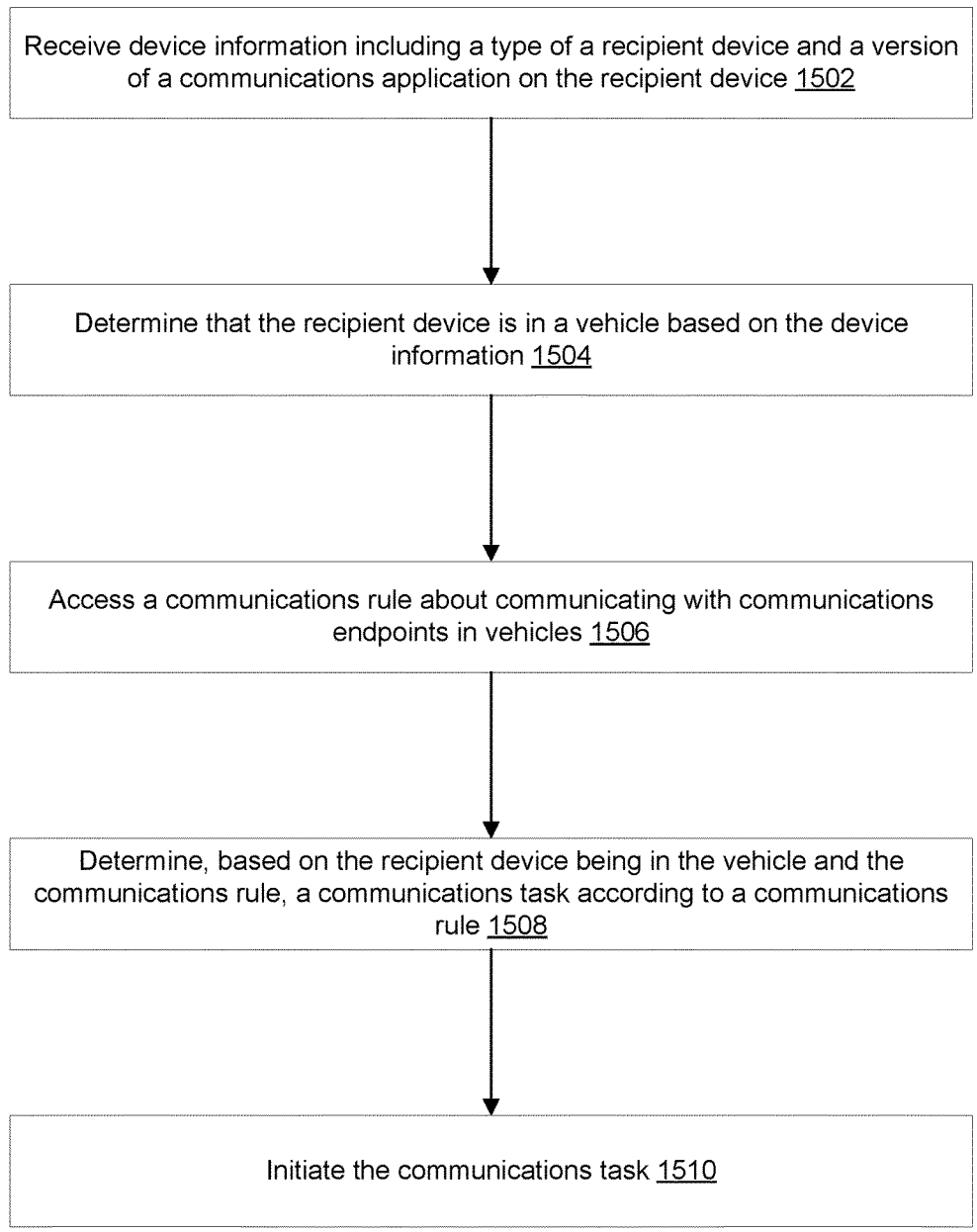
FIG. 15 shows an illustrative flow for managing communications with a device in a vehicle based on a type of the device and a version of a communications application on the device, in accordance with various embodiments.

FIG. 15 shows an illustrative flow for managing communications with a device in a vehicle based on a type of the device and a version of a communications application on the device, in accordance with various embodiments. In an example, the illustrative flow may be performed in response to a Drop In request, where the device type and/or software version may be sufficient to determine whether the requested Drop In should be allowed, changed to a Call, or denied. Operations of the illustrative flow of FIG. 15 can be implemented as sub-operations of certain operations of the illustrative flow of FIG. 13.

The illustrative flow may start at operation 1502, where the computer system may receive device information including a type of a recipient device and a version of a communications application on the recipient device. In an example, the computer system may access this information from a data store in response to a request to a communications of a particular type (e.g., Drop In) from an initiating device.

At operation 1504, the computer system may determine that the recipient device is in a vehicle based on the device information. In an example, the computer system may access a data store that associates device installation with device types and/or software versions. The computer system may retrieve the device installation based on the device information and the device installation can indicate that the recipient device is integrated with a vehicular system or is a standalone device interfacing with the vehicular system.

At operation 1506, the computer system may access a communications rule about communicating with communications endpoints in vehicles. Similarly to operation 1310 of FIG. 13, here the computer system may retrieve the communications rules based on its applicability to device installations in vehicles or based on its particular association with an identifier of the recipient device or a user account of the contact.

At operation 1508, the computer system may determine a communications task based on the association with a communications endpoint in the vehicle indicated by the device information and on the communications rule. For instance, the communications rule may prohibit any incoming Drop Ins to the vehicle. Based on the recipient device being integrated or interfacing with a vehicular system, the communications task may indicate a denial of the requested Drop In communications. As illustrated herein above in connection with FIG. 12, the computer system may also or alternatively rely on the stored indication about the available communications capability of the recipient device to determine the communications task. At operation 1510, the computer system may initiate the communications task.

Figure 16:
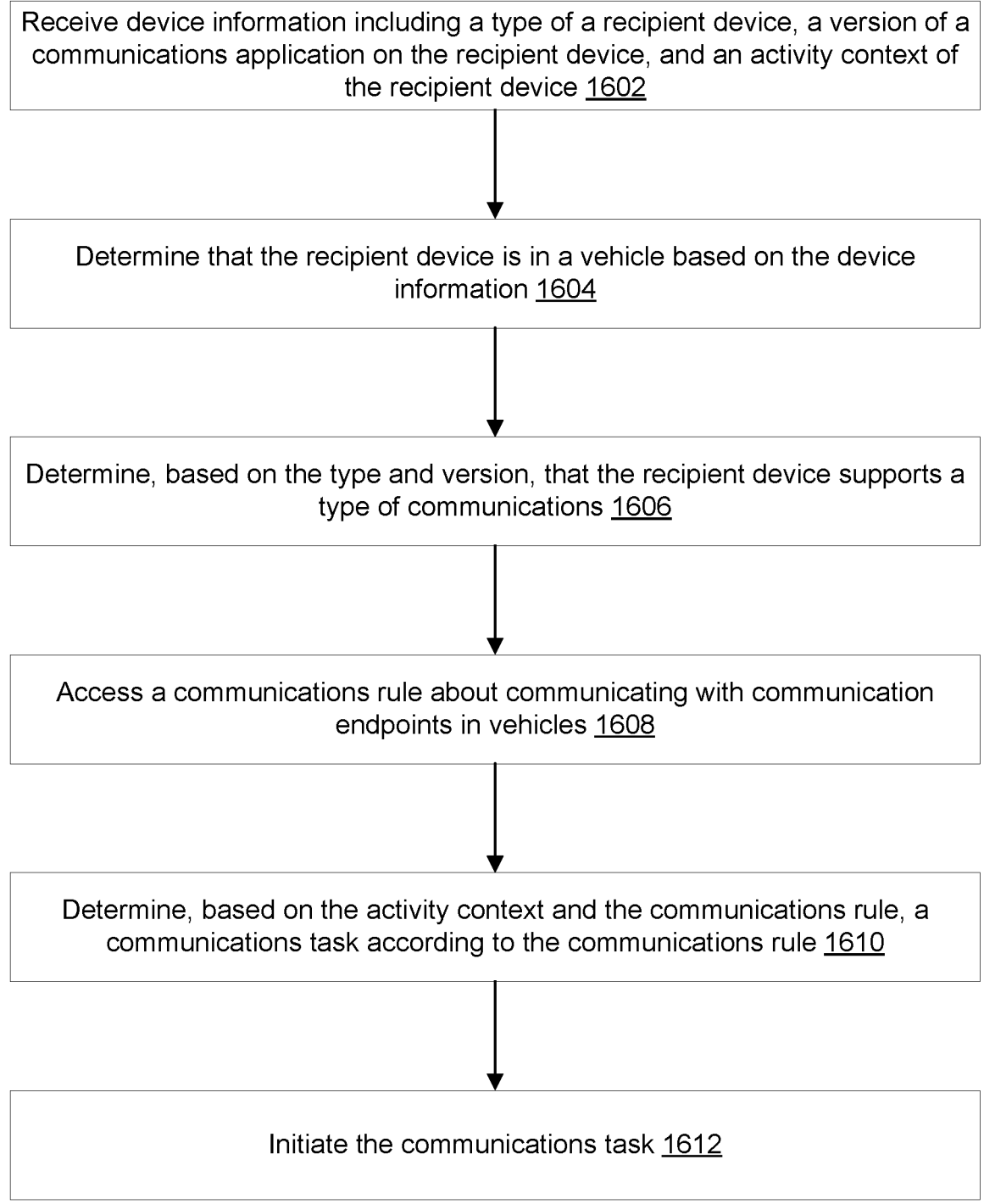
FIG. 16 shows an illustrative flow for managing communications with a device in a vehicle based on an activity context of the device, in accordance with various embodiments.

FIG. 16 shows an illustrative flow for managing communications with a device in a vehicle based on an activity context of the device, in accordance with various embodiments. In an example, the illustrative flow may performed in response to a Drop In request, where the activity context may be used in addition to the device type and/or software version to determine whether the requested Drop In should be allowed, changed to a Call, or denied. Operations of the illustrative flow of FIG. 16 can be implemented as sub-operations of certain operations of the illustrative flow of FIG. 13.

The illustrative flow may start at operation 1602, where the computer system may receive device information including a type of a recipient device, a version of a communications application on the recipient device, and an activity context of the recipient device. In an example, the computer system may access this information from a data store in response to a request to a communications of a particular type (e.g., Drop In) from an initiating device.

At operation 1604, the computer system may determine that the recipient device is in a vehicle based on the device information, similarly to operation 1504 of FIG. 15. At operation 1606, the computer system may determine based on the type of the recipient device and its software version that the recipient device supports the particular type of the requested communication. In an example, the computer system may access a data store that associates communications functionalities with device types and/or software versions. The computer system may retrieve the communications functionalities supported by the recipient device based on the device information and, accordingly, determine the support.

At operation 1608, the computer system may access a communications rule about communicating with communications endpoints in vehicles, similarly to operation 1506 of FIG. 15. At operation 1610, the computer system may determine, based on the activity context and the communications rule, a communications task according to the communications rule, similarly to operation 1312 of FIG. 13. As illustrated herein above in connection with FIG. 12, the computer system may also rely on the stored indication about the available communications capability of the recipient device to determine the communications task. At operation 1612, the computer system may initiate the communications task.

In various embodiments of the present disclosure, a user has control over user-related information that can be collected and analyzed. Depending on the type of user-related information, appropriate measures are taken to ensure protection of this information, to empower the users to determine what data can be collected and analyzed, as well as empower the users to indicate which portions of the information should be deleted and/or no longer collected and/or analyzed. Further, the user has control over opting in to the communications services described herein and, if opted in, to opt out at any time. The features provided by the communication services are compliant with the applicable regulations. For instance, if an entity has legal authority over a local area and prohibits drop ins to vehicles in this area, drop ins to a vehicle can be automatically disabled based on the location data (e.g., GPS data) of the vehicle indicating that the vehicle is within the local area.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A system comprising:
   a user device of a caller;
   a first voice-controlled device (VCD) and a second VCD associated with a user account that is a contact of the caller; and
   a communications system comprising one or more processors and one or more computer-readable storage media storing instructions that, upon execution by the one or more processors, configure the communications system to:
      store, in the user account, a permission to automatically establish synchronous audio communications sessions by the first VCD;
      establish a first communications session with the first VCD using a first session initiation protocol (SIP) request from the first VCD;
      receive, from the first VCD, first data identifying a first type of the first VCD and a first version of a first communications application on the first VCD;
      determine from the first data that a communications rule permits the first VCD to automatically establish a first synchronous audio communications session with the user device;
      establish a second communications session with the second VCD using a second SIP request from the second VCD;
      receive, from the second VCD, second data identifying a second type of the second VCD and a second version of a second communications application on the second VCD;
      determine a vehicle-related context of the second VCD based at least in part on the second data, the second data indicating that the second VCD is in a vehicle;
      determine that the communications rule prohibits the second VCD being in the vehicle from automatically establishing a second synchronous audio communications session; and
      store an indication that the second VCD is prohibited from automatically establishing the second synchronous audio communications session.

2. The system of claim 1, wherein the execution of the instructions further configure the communications system to:
   determine, based at least in part on the second data, that a request from the user device for the second synchronous audio communications session is allowable based at least in part on a user action at the second VCD accepting the request;
   store a second indication that the second VCD is permitted to establish the second synchronous audio communications session based at least in part on the user action;
   receive the request from the user device; and
   instruct the second VCD to establish the second synchronous audio communications session with the user device based at least in part on the user action.

3. The system of claim 1, wherein the execution of the instructions further configure the communications system to:
   receive, from the second VCD, third data indicating an activity context of the second VCD;
   determine that the second VCD is no longer in the vehicle based at least in part on the third data;
   generate a second indication to permit the second VCD to automatically establish the second synchronous audio communications session; and
   add, to a contact list of the caller, an identifier of the second VCD based at least in part on the second indication.

4. A method implemented by a computer system, the method comprising:
   storing, in a user account associated with a first user device, permission data used to establish a type of communications session by the first user device, the type of communications session being such that a synchronous communications session is established in response to an initiating device different from the first user device requesting the type of communications session and without a user action at the first user device to manually accept the synchronous communications session;
   determining, based at least in part on first contextual data associated with a second user device, that the second user device is permitted to establish the type of communications session as a recipient device, the second user device associated with the user account, the first contextual data indicating a context of the second user device;

receiving, from the second user device, second contextual data associated with the second user device;

determining, based at least in part on the second contextual data, that the second user device is prohibited from establishing the type of communications session, the second contextual data indicating a different context; and storing an indication that the second user device is prohibited from establishing the type of communications session.

5. The method of claim 4, wherein the synchronous communications session comprise a synchronous audio communications sessions, wherein the second user device comprises a voice-controlled device (VCD) in a vehicle, and wherein the second contextual data comprises a type of the VCD indicating that the VCD is in the vehicle.

6. The method of claim 4, wherein the second contextual data indicates that the second user device is in a vehicle and indicates that the vehicle is in motion, and wherein determining that the second user device is prohibited from establishing the type of communications session is based at least in part on the motion of the vehicle.

7. The method of claim 6, further comprising:
receiving, from the second user device at a different point in time third contextual data indicating that the vehicle is stationary;
determining, based at least in part on the third contextual data, that the second user device is permitted to establish the type of communications session; and
generating a second indication to permit the second user device to establish the type of communications session.

8. The method of claim 4, wherein the second contextual data indicates a speed associated with the second user device, and wherein determining that the second user device is prohibited from establishing the type of communications session is based at least in part on a comparison of the speed to a speed threshold.

9. The method of claim 8, further comprising:
determining, based at least in part on the speed exceeding the speed threshold, that the speed is lower than a second speed threshold; and
determining that the second user device is permitted to establish a different type of communications session.

10. The method of claim 4, further comprising:
generating, based at least in part on the first contextual data, a second indication about permitting the second user device to establish the type of communications session.

11. The method of claim 10, wherein the first contextual data indicates that the second user device is connected to a WiFi network, wherein the second indication is generated based at least in part on the second user device being connected to the WiFi network.

12. The method of claim 4, further comprising:
storing a rule specifying a condition to prohibit the second user device from establishing the type of communications session, wherein determining that the second user device is prohibited from establishing the type of communications session comprises determining that the condition is satisfied based at least in part on the second contextual data.

13. The method of claim 4, wherein storing the indication comprises storing data indicating that the second user device is prohibited from being the recipient device to the type of the communications session with the initiating device.

14. A communications system comprising:
one or more processors; and
one or more computer-readable storage media storing instructions that, upon execution by the one or more processors, configure the communications system to:
store, in a user account associated with a first user device, permission data used to establish a type of communications session by the first user device, the type of communications session being such that a synchronous communications session is established in response to an initiating device different from the first user device requesting the type of communications session and without a user action at the first user device to manually accept the synchronous communications session;
determine, based at least in part on first contextual data associated with a second user device, that the second user device is permitted to establish the type of communications session as a recipient device, the second user device associated with the user account, the first contextual data indicating a context of the second user device
receive, from the second user device, second contextual data associated with the second user device;
determine, based at least in part on the second contextual data, that the second user device is prohibited from establishing the type of communications session the second contextual data indicating a different context; and
store an indication that the second user device is prohibited from establishing the type of communications session.

15. The communications system of claim 14, wherein the second contextual data indicates that the second user device is in a vehicle, and wherein the execution of the instructions further cause the communications system to:
receive, from the first user device, third contextual data indicating that the first user device is not in the vehicle; and
determine, based at least in part on the third contextual data and the permission data, that the first user device is permitted to establish the type of communications session without the user action.

16. The communications system of claim 15, wherein the initiating device is associated with a caller, wherein the user account is associated with a contact of the caller, and wherein the execution of the instructions further cause the communications system to:
send, to the initiating device, an option to request the first user device and not the second user device to automatically establish the type of communications session.

17. The communications system of claim 14, wherein the initiating device is associated with a caller, wherein the user account is associated with a contact of the caller, and wherein the execution of the instructions further cause the communications system to:
receive, from the initiating device, a request for communications with the second user device of the contact;
determine, based at least in part on natural language processing of a user utterance from the request, a user intent for the type of communications session; and
deny the request based at least in part on the indication.

18. The communications system of claim 17, wherein the execution of the instructions further cause the communications system to:
- determine that the second user device is permitted to establish a second type of communications session, the second type being such that a second synchronous communications session is established based at least in part on the request and on a second user action at the second user device to manually accept the second synchronous communications session; and
- instruct the initiating device to update a graphical user interface (GUI), wherein the update indicates that the second type of communications session with the second user device is available.

19. The communications system of claim 14, wherein the initiating device is associated with a caller, wherein the user account is associated with a contact of the caller, and wherein the execution of the instructions further cause the communications system to:
- receive, from the initiating device, a request for communications with the contact;
- determine, based at least in part on natural language processing of a user utterance from the request, a user intent for the type of communications session;
- identify the first user device and the second user device based at least in part on the user account;
- select the second user device as a recipient of the communications based at least in part on presence information associated with the contact; and
- deny the request based at least in part on the indication.

20. The communications system of claim 14, wherein the execution of the instructions further cause the communications system to:
- receive, from the second user device, third contextual data indicating that the second user device is connected to a home network; and
- generate, based at least in part on third contextual data, a second indication about permitting the second use device to establish the type of communications session.

* * * * *